(12) United States Patent
McGrath, Jr.

(10) Patent No.: US 7,895,951 B1
(45) Date of Patent: Mar. 1, 2011

(54) APPARATUS AND METHOD UTILIZING THE LINEAR INDUCTION MOTOR, LIM, TO AUGMENT MUSCLE-POWERED VEHICLE TRAVEL

(76) Inventor: Patrick Joseph McGrath, Jr., Issaquah, WA (US)

(*) Notice: Subject to any disclaimer, the term of this patent is extended or adjusted under 35 U.S.C. 154(b) by 263 days.

(21) Appl. No.: 12/117,651

(22) Filed: May 8, 2008

(51) Int. Cl.
*B60L 13/03* (2006.01)
(52) U.S. Cl. .................. 104/292; 105/95; 104/293; 191/13
(58) Field of Classification Search .............. 105/95; 191/10, 13, 45 R, 47, 59, 59.1; 104/287, 104/297, 291, 292
See application file for complete search history.

(56) References Cited

U.S. PATENT DOCUMENTS

| | | | |
|---|---|---|---|
| 4,061,089 A * | 12/1977 | Sawyer | 104/23.2 |
| D294,014 S | 2/1988 | McMurtrey | |
| 5,237,263 A | 8/1993 | Gannon | |
| 6,578,495 B1 | 6/2003 | Yitts | |
| 6,619,212 B1 | 9/2003 | Stephan et al. | |
| 6,976,551 B2 | 12/2005 | Spanski | |
| 2003/0173173 A1* | 9/2003 | Stephan et al. | 191/10 |
| 2007/0089956 A1* | 4/2007 | Kozsar | 191/10 |

OTHER PUBLICATIONS

Ian Pearson, The future of the bicycle, Jun. 2007, http://www.futurizon.com/articles/bikejun07.pdf.*
Baldor Motion Products, AC Linear Induction Motor, Mar. 2002, pp. H-26 thru H-29, BR1202, Baldor Electric, Ft. Smith, AR 72902-2400, USA.

* cited by examiner

*Primary Examiner* — S. Joseph Morano
*Assistant Examiner* — Zachary Kuhfuss
(74) *Attorney, Agent, or Firm* — The Hamby Law Firm; Bruce Wayne Hamby

(57) ABSTRACT

Persons on a bicycle or other muscle-powered vehicle, equipped through an attachment means, with a reaction plate secondary of a linear induction motor, LIM, receive intermittent, augmenting propulsion forces from a sequence of spaced LIM primary coil assemblies, positioned flush with a surface on a pathway, to augment the rider's muscle-created propelling forces when the LIM primaries are receiving power supplied by a utility. At each LIM primary, interacting magnetic fields are commonly created as the attached bicycle LIM secondary is moveably positioned by the rider proximately the centerline of a respective LIM primary. The augmenting propelling force results as thrust, derived from the interaction of the respective magnetic fields of the primary and secondary of the now temporarily completed linear induction motor at the respective, spaced locations of the primaries along the pathway. Selectively specified attachment means are provided to mount and to control the vertical position of the LIM secondary on the bicycle or other, manually-powered vehicle.

15 Claims, 18 Drawing Sheets

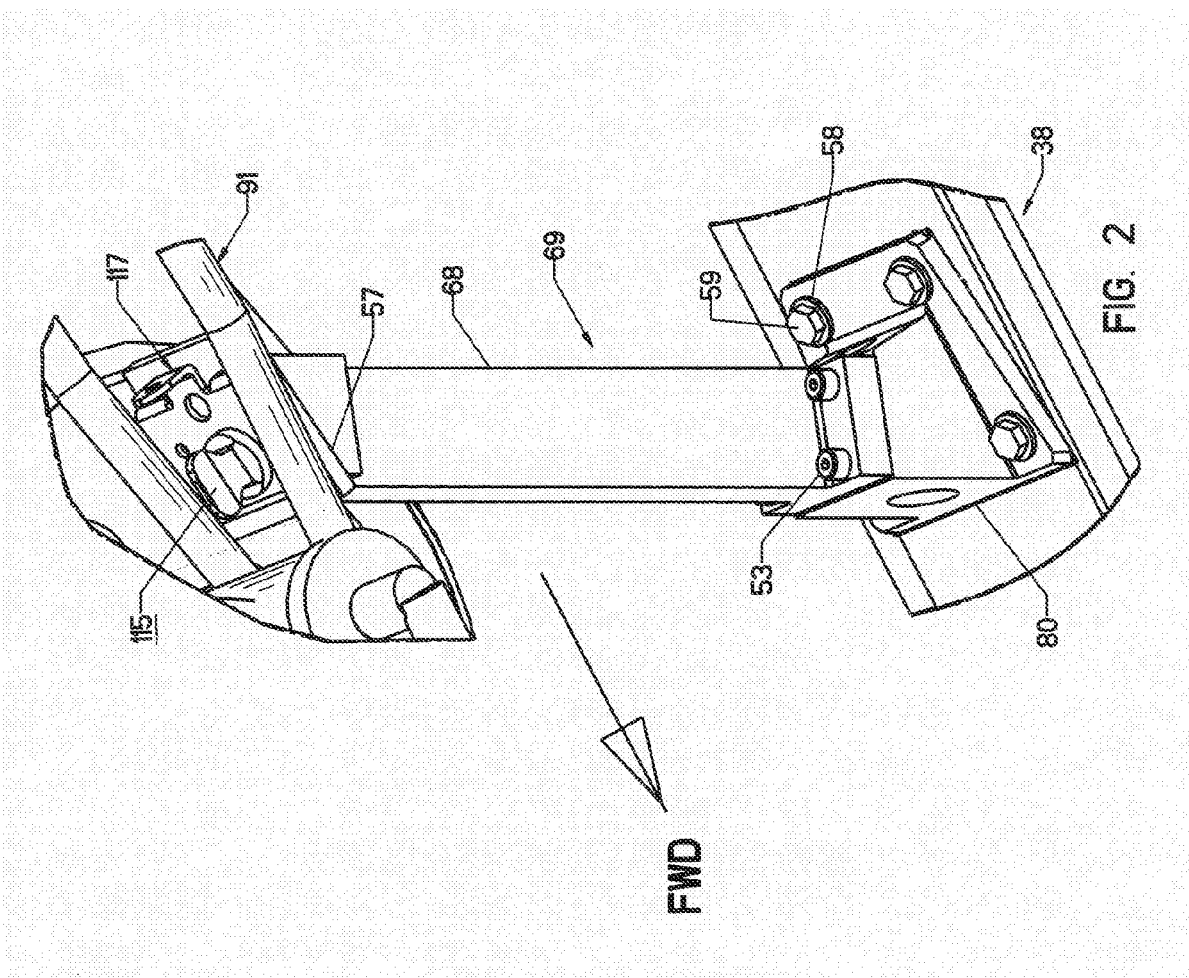

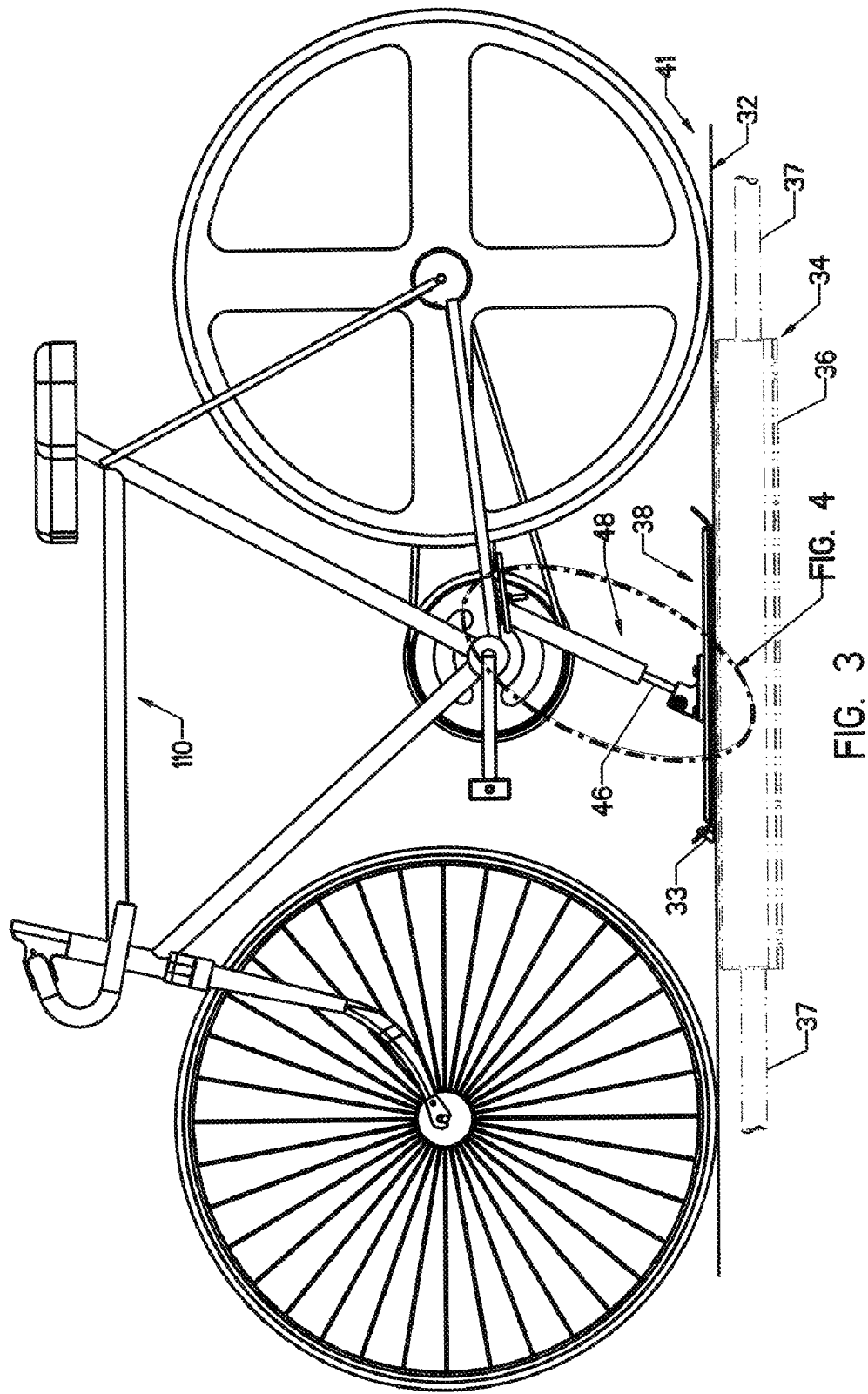

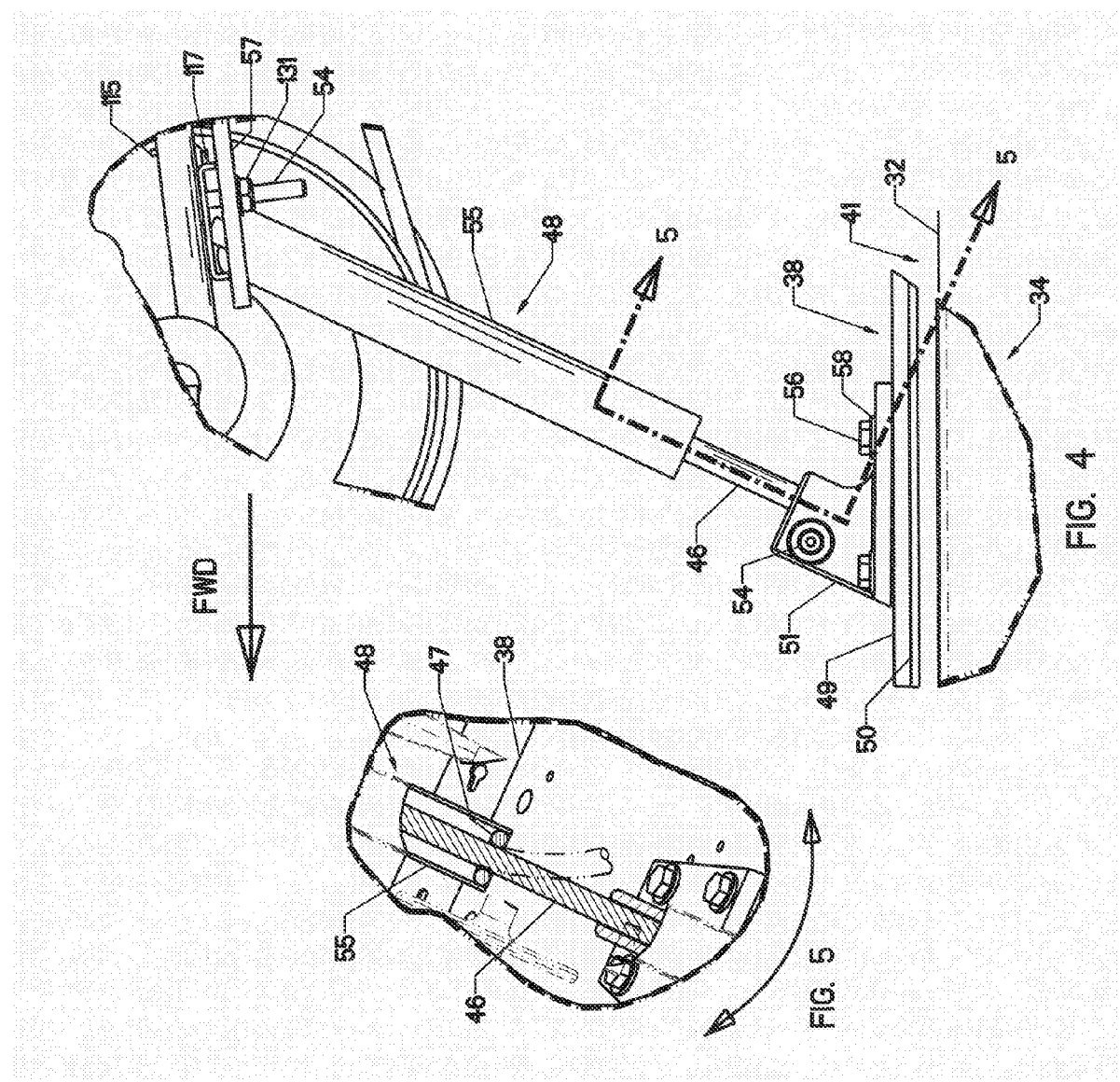

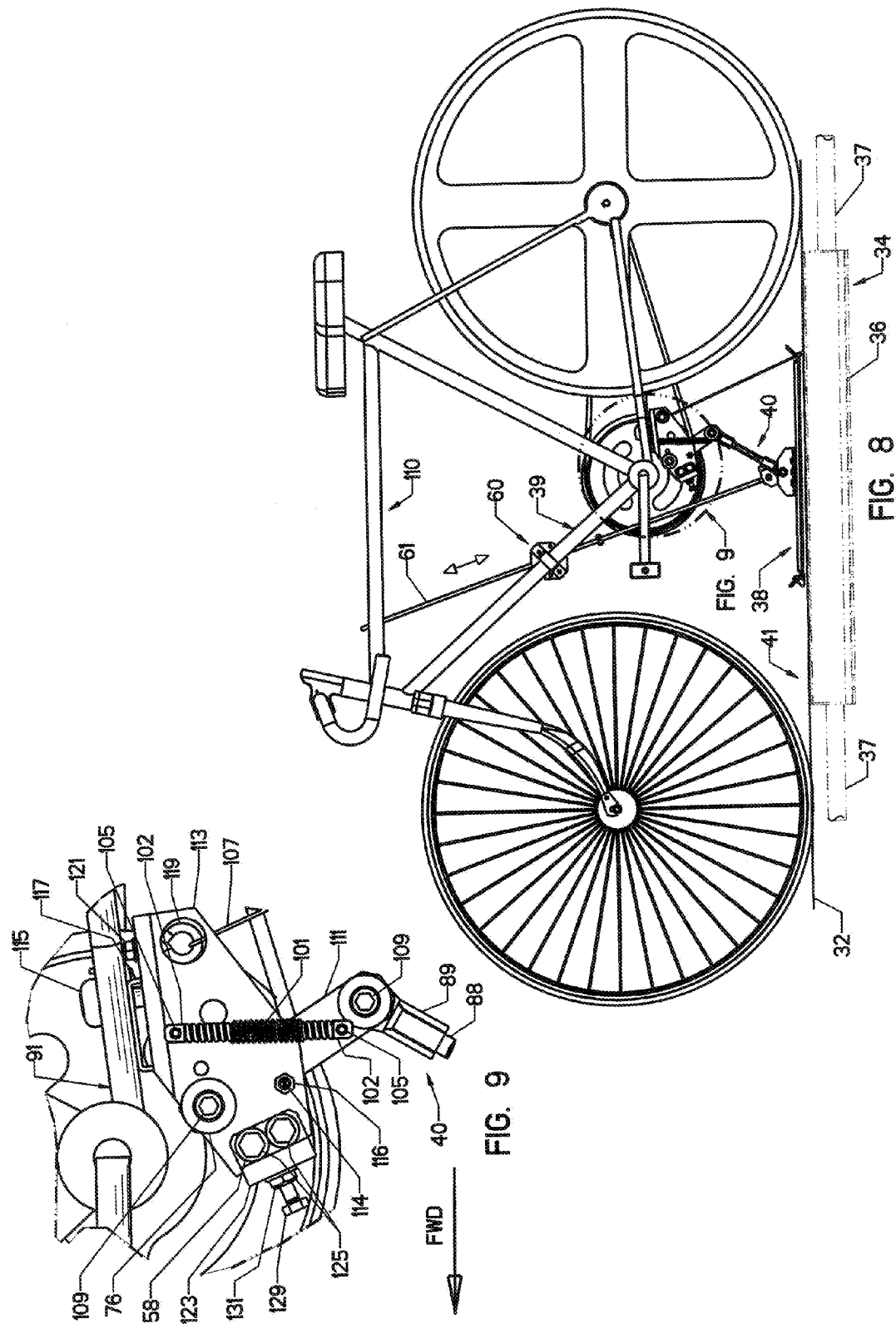

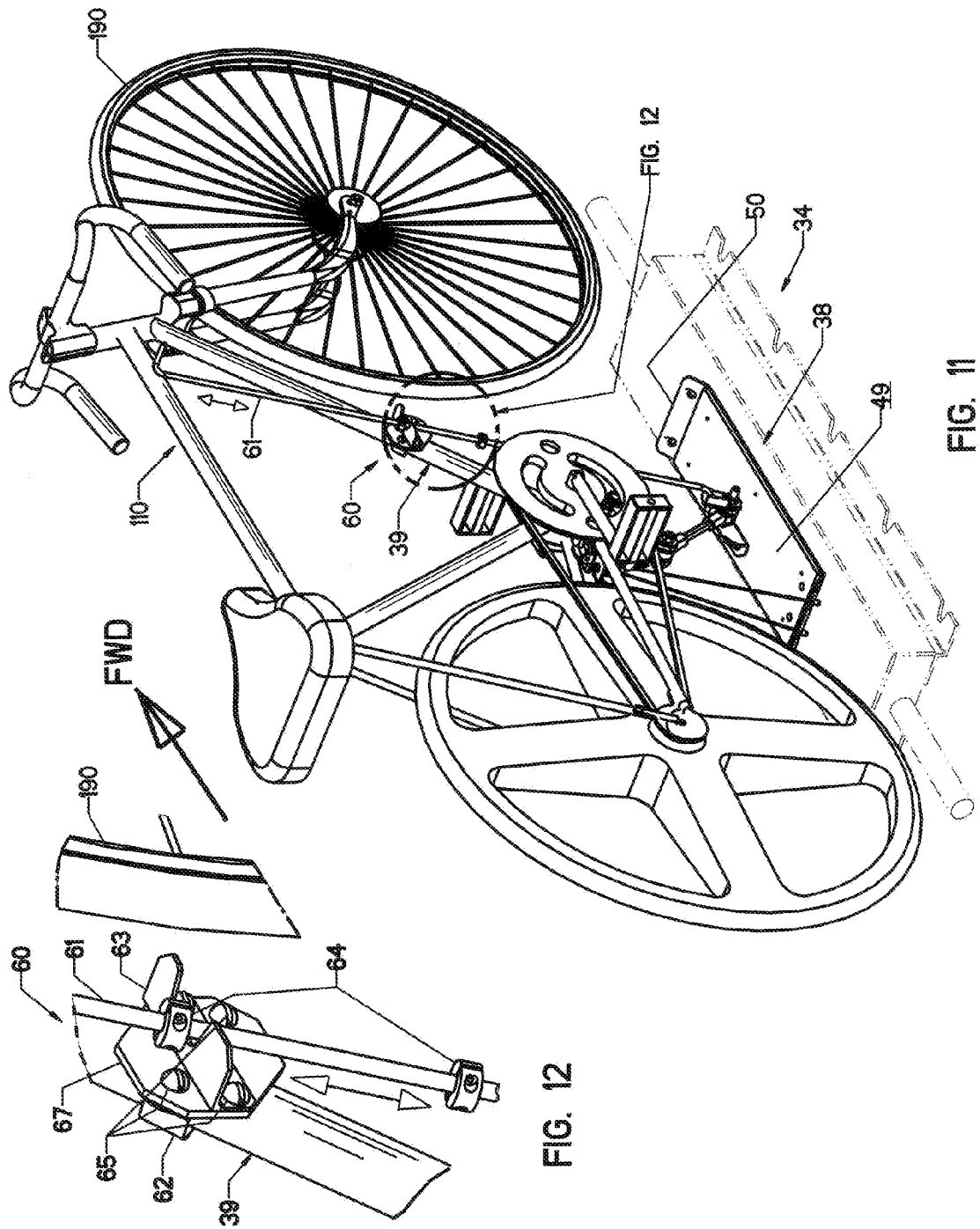

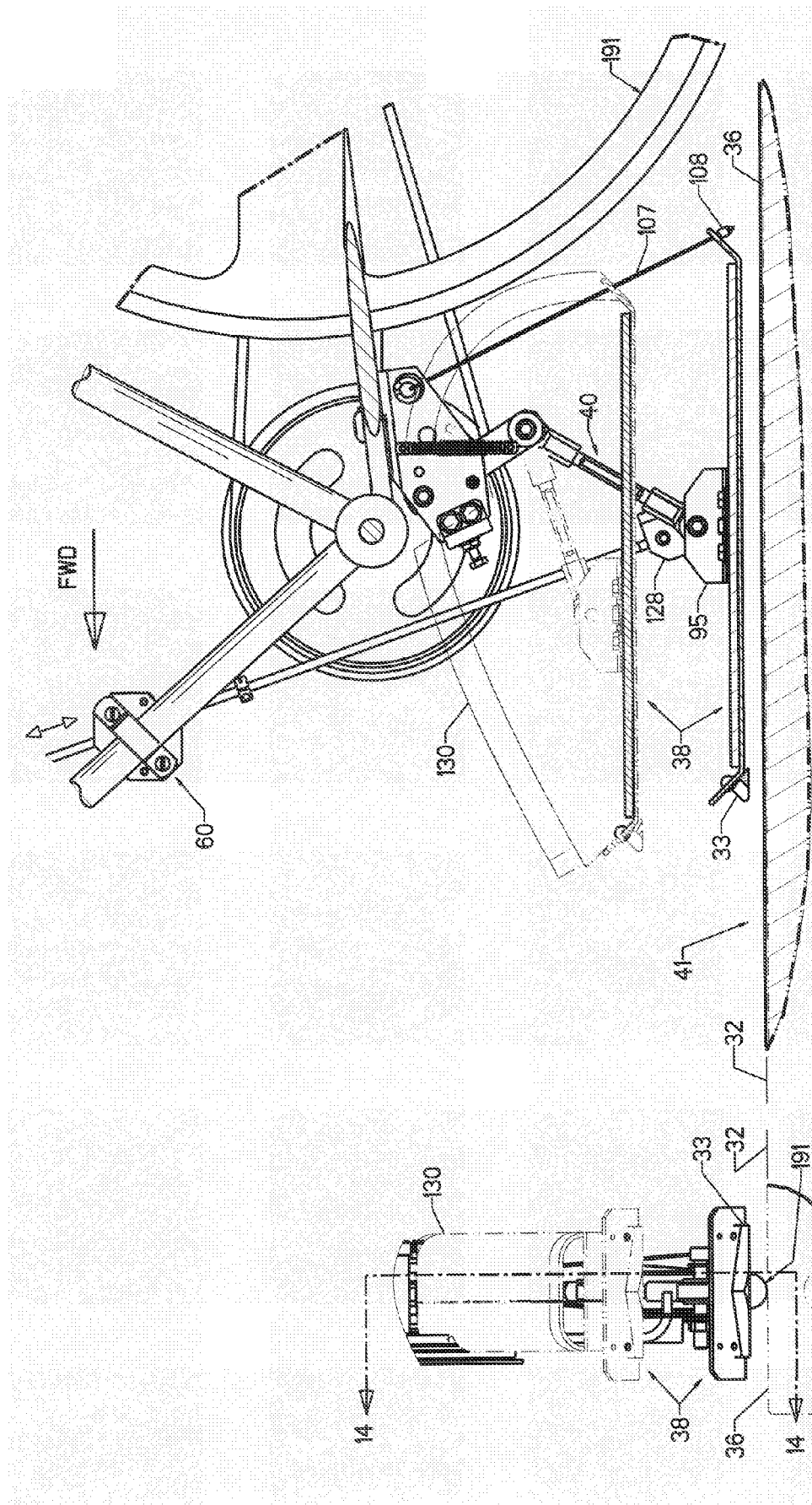

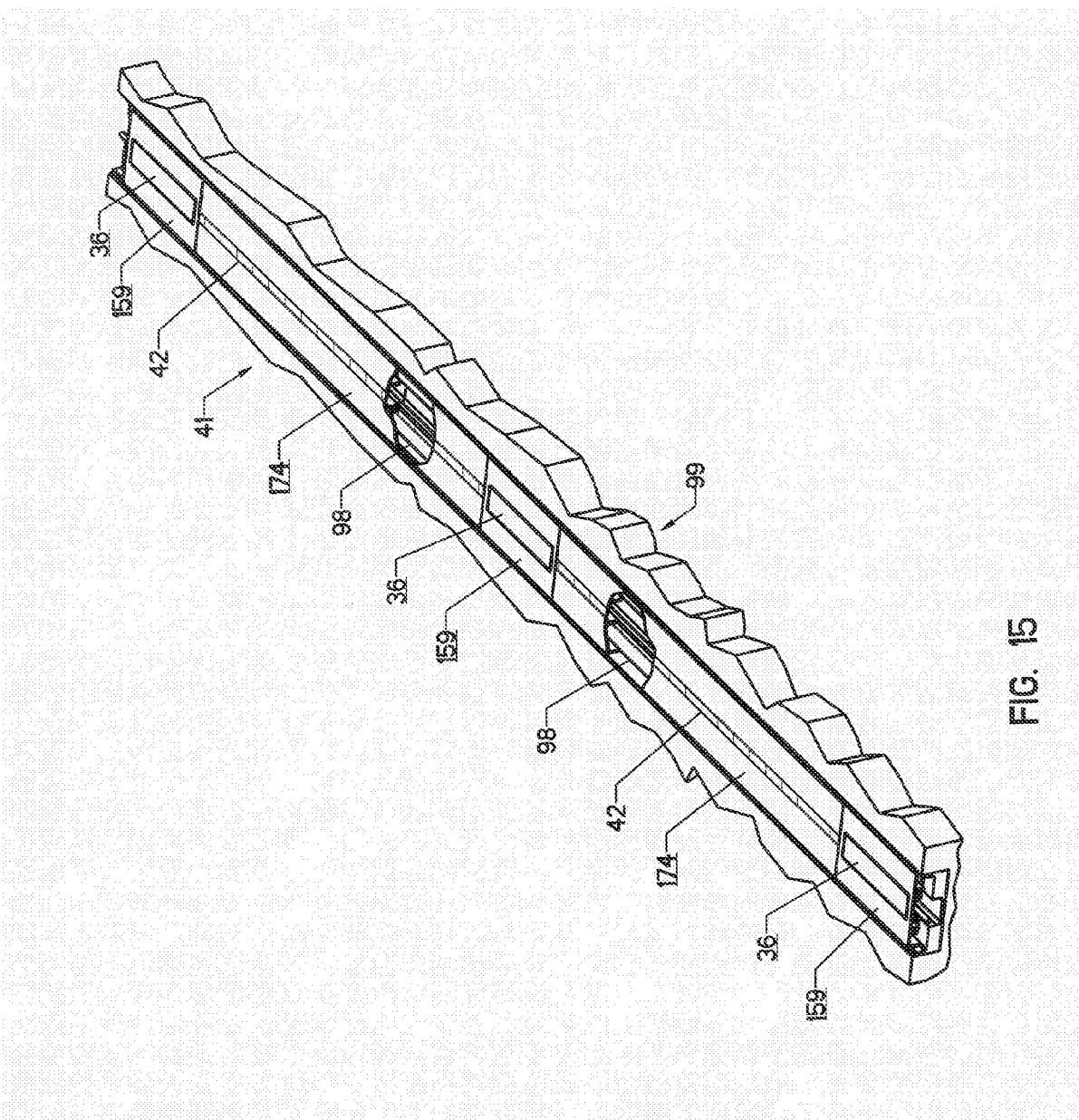

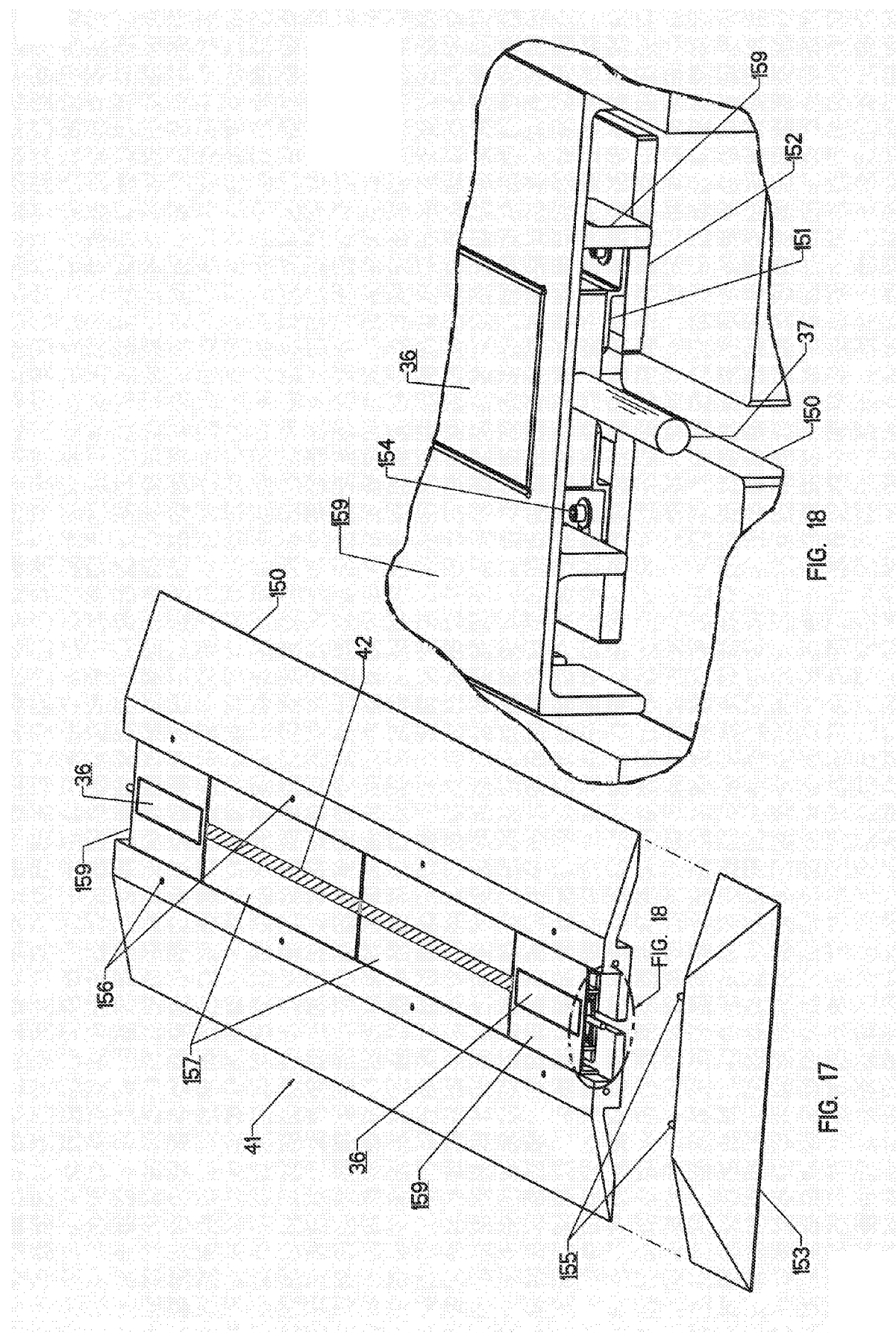

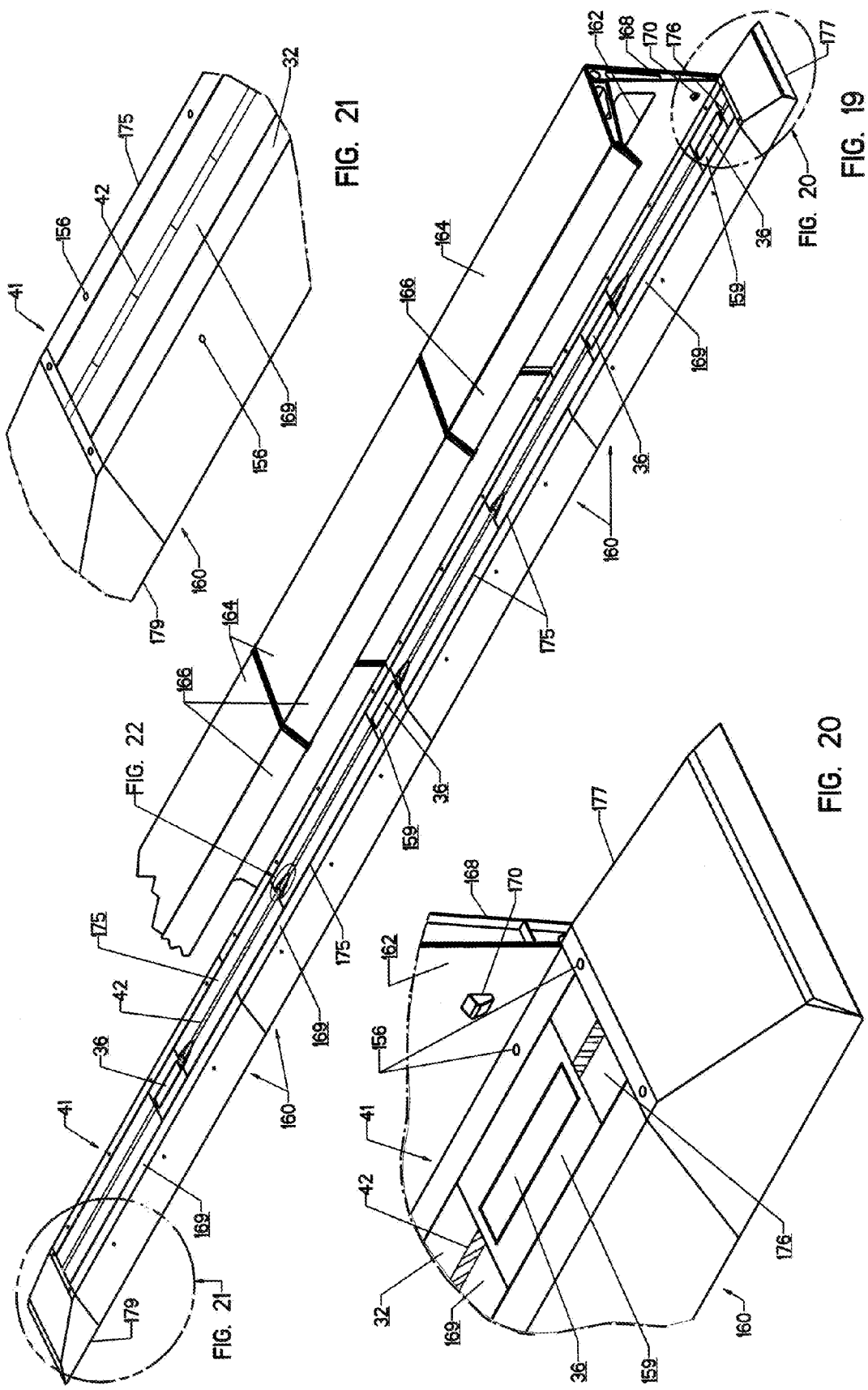

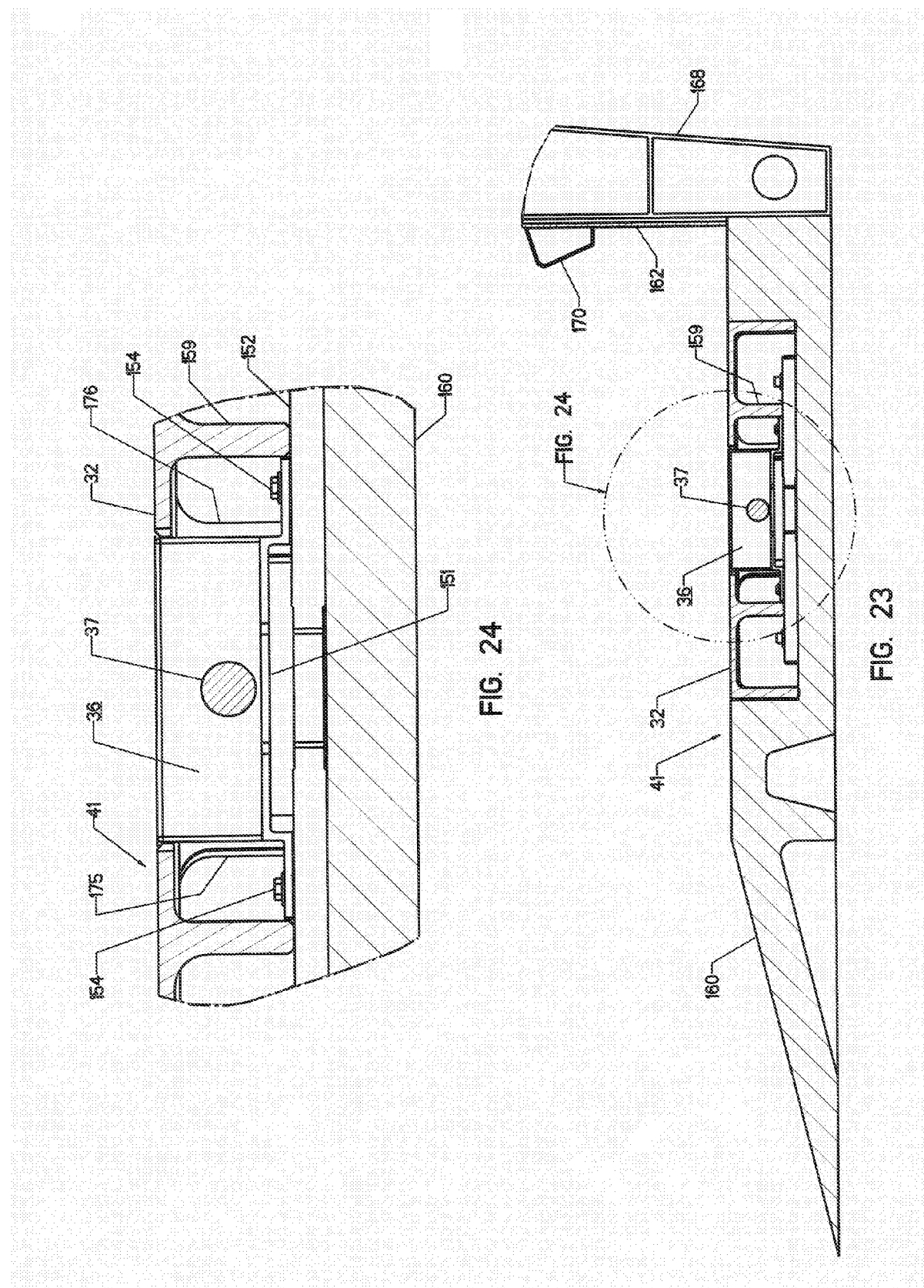

APPARATUS AND METHOD UTILIZING THE LINEAR INDUCTION MOTOR, LIM, TO AUGMENT MUSCLE-POWERED VEHICLE TRAVEL

BACKGROUND

The field of this invention is bicycle travel and the use of a bicycle.

Propulsion power derived from the operation of linear induction motors, briefly known as LIMs, has been applied to rail vehicles, amusement park roller coasters, etc.

To date, muscle-powered vehicles, such as bicycles, equipped with power augmentation systems use either electric motors with batteries or gasoline engines. However, when those systems cease to operate due to dead batteries, fuel exhaustion or mechanical failure, riders are faced with the prospect of pedaling, pushing or abandoning their bicycles. The added weight of the power-augmentation systems further exacerbates the problem of moving the vehicle once those systems become dysfunctional.

In many instances, muscle-powered vehicles, such as bicycles, might be a more convenient and appropriate form of transportation. Instead, the public relies heavily on automobiles, contributing to congestion, smog, and other environmental damage. Other forms of public transportation, buses, light rail, van pools, etc, have proven increasingly expensive for public transportation and still contribute significantly to environmental damage with their emissions.

The LIM is made up of two separate components (i.e.) the primary coil assembly, hereinafter called the LIM primary, and a reaction plate secondary, hereinafter called the LIM secondary. The primary is designed and built commercially. The LIM secondary is designed and supplied by the LIM user. When these two parts are in close, three-dimensional proximity, and electric power is delivered to the LIM primary coil windings, a directed, traveling magnetic field is created. This field induces current in the LIM secondary which creates its own magnetic field. The interaction of the two magnetic fields generates the forces of linear motion. See Baldor catalog BR 1202, pages H-26 through H-29.

Following are some applications of powered bicycles and LIM motors:

Among bicycle patents selected are U.S. Pat. No. 6,976,551, issued Dec. 20, 2005, class 180/207, to Mr. Harold Spanski. It describes "A power-assist system for a bicycle by which the bicycle can be operated in various modes." In the listing of modes, Mr. Spanski describes " . . . a pedal-alone mode, a power-assist only mode, a pedal mode with power assist, and a coasting mode". There are two overriding clutches in the system. The high RPM power source is carried on the bicycle and can be either petroleum based or electric. Among the stated desirable features is the fact that the system "can easily be incorporated in a typical prior art bicycle".

A second bicycle drive is U.S. Pat. No. 5,237,263, issued Aug. 7, 1993, class 323/288, to H. M. Gannon as "Electric and pedal driven bicycle with solar charging". " . . . The preferred embodiment consists of a standard street bicycle with multi-speed transmission, plus an electrical propulsion system and a solar charging apparatus. This preferred embodiment is normally powered by a combination of motor and pedals, coupled such that either or both may provide power at any time . . . . "

Among LIM patents selected are, U.S. Pat. No. 4,061,089, issued Dec. 6, 1977, in class 104/232, Mr. Elbert M. Sawyer illustrated and described his "Personal Rapid Transit System", which is said to be a " . . . land transportation system for a vehicle that is supported and guided by air bearings." This patent describes his personal rapid transit system which utilizes LIM propulsion power. In Sawyer's system, "The vehicle requires no driver or motorman because a guideway determines the direction of travel . . . . The vehicle is propelled by a linear synchronous motor, LSM, when on the guideway. "A linear inductor alternator provides on-board electric power." The vehicle has a capacity of four to six passengers and is constrained to stay on the track system. There are linear motor primary units embedded in the guideway and placed in juxtaposition with each other and having "cooperating secondary members" attached to the vehicle. The " . . . motor segments are powered by commercial electric power lines, whose frequency is constant throughout the network." The speed of the vehicle is regulated by changing voltage and frequency as applied to the LSM primary winding. There are ON and OFF ramps for access by the vehicle.

A U.S. Pat. No. 6,578,495, issued Jun. 17, 2003, class 104/292, to Yitts, et. al. is titled "Modular linear motor tracks and methods of fabricating same". He notes in the Abstract, "These are integrated during the manufacturing in to a single component or module for ease of shipping and precision of installation at the site where the guideway is to be installed."

Another U.S. Pat. No. 6,619,212, issued Sep. 16, 2003, class 104/292, to Stephan, et. al. is titled: "Method for achieving and maintaining desired speed on a guideway system." In this method, as in Sawyer, there is a linear induction motor and a guideway system using "computer control system". Cruising speed for this system is to be " . . . at least 240 kilometers per hour". The method of Stephan, et. al. addresses the propulsion of "a vehicle on an automated roadway system or guideway system." Also involved is a need for using the linear induction motor to accelerate the vehicle, along with "providing speed instructions to the vehicle using the computer control system so as to cause the vehicle to use the alternate power source to maintain a desired cruising speed on a main section of the guideway system".

None of the above systems lend themselves to a practical, low cost, light weight propulsion power and pathway system for the bicycle riding and commuting public.

SUMMARY

It is an objective to provide a means of linking the bicycle with existing population centers and transportation hubs as a practical enhancement to commuter travel through easily accessed propulsion power sources positioned in a pathway.

An apparatus is developed which permits the rider of a bicycle, or other manually-powered vehicle to utilize the power of multiple, temporarily completed linear induction motors, LIMs, comprised of separate LIM components, i.e., a LIM primary positioned in a pathway and a LIM secondary with attachment means, adapted to a bicycle. A utility provides the power source for the linear sequence of selectively spaced LIM primaries which function in a low power draw mode until a vehicle-mounted LIM secondary is positioned proximate a primary, at which time the increased power of the fixed LIM primary is developed to make a complete LIM motor and induce an electro-magnetic linear force in the attached LIM secondary on the bicycle, which force then urges the bicycle forward with power augmenting that of the rider, who guides and controls the bicycle.

The plurality of LIM primaries are selectively positioned with their top surfaces arranged flush with the ridable surface of a marked pathway on a road surface and spaced at predetermined distances in a linear progression. The spacing chosen is dependent upon the expected pathway slope and mass range of vehicles using the pathway. The spaced LIM primaries are adapted to a sub-surface ducting which joins conduit-covered power lines receiving power from a utility. In another embodiment, a fabricated pathway is positioned on ground level and anchored to an underlying right of way. The fabricated pathway has, in two or more embodiments, open, surfaces accessed from the end and either side with a sloping surface so that the rider of a bicycle is able to ride on or off on either side of the above ground pathway at a preferred location and partially enclosed, weather protected ridable surface, accessed from the end and one side only.

The bicycle, is guided by the rider along a marked centerline of the pathway to continuously position the bicycle's LIM secondary proximately parallel with the lengthwise centers of the succession of electrically powered LIM primaries. The low weight, per se, of the non-powered LIM secondary, secured with a selected attachment means to the frame of a manually powered vehicle, such as a bicycle, interacts with each electrically powered LIM primary in a pathway to receive the electro-magnetically induced, periodic thrust to the LIM secondary attachment on the bicycle.

The bicycle, with the light weight LIM secondary attached, in conjunction with the powered LIM primaries in a pathway, can provide convenient and more consistent travel for the bicycle commuter throughout larger metro areas. Moreover, people may now have a more practical method of accessing public transportation from outlying areas and being less affected by automotive congestion. Bicycle pathways, having less stringent structural requirements than conventional road surfaces, also use less of the primary building materials thus permitting lower cost pathways with LIM primaries receiving electrical power that may serve riders of bicycles along populated access routes leading to locales where public transportation is available to continue a longer trip.

The LIM primaries in a pathway offer a relatively high working efficiency for the apparatus, which requires electrical power for only a nominal thirty seconds out of every horizontal, 1.6 kilometers or one mile traveled. For the nominal three minutes of time that it takes to go 1.6 kilometers, the required power is applied less than 10 percent of the total transit time to give the intermittent, electro-magnetic thrust required to augment the rider's speed. The design speed of a nominal 32 kilometers per hour or 20 miles per hour, gives the definition of an electric bicycle's maximum speed, as taken from TEA-21, the Transportation Equity Act for the $21^{st}$ Century. The propulsion power thrust is supplied only up to the design velocity chosen, at which point, there is no added thrust provided. The design builds in a safety element that is easily controlled by the rider who can guide the bicycle on and off the width of the visible centerline marking to change the degree of electro-magnetic boost thrust from maximum available to zero.

The same LIM primary power method can be electrically switched in polarity to cause the directed magnetic traveling wave of the LIM primary to move in the opposite direction, thus opposing the bicycle momentum force on downhill pathways, where the rider needs augmented wheel braking capability in wet weather in order to make a safer and quicker stop on wet road surfaces.

Thus, while there are a nominal 100 million bicycles in America, the stated Congressional desires, for the bicycle, as written in TEA-21, the needs of TEA-21 have not been effectively met with existing commuter bicycle designs and functionality. Among these needs are those made specific in SEC. 3039 (a), "Purposes—The purposes of this section are to encourage and promote the development of transportation systems for the betterment of the national parks and other units of the National Park System, . . . minimize transportation fuel consumption, reduce pollution (including noise and visual pollution) and enhance visitor mobility . . . ".

Bicycles that are powered by relatively heavy, internal combustion engines or various, battery-driven, electric-powered means, have been developed over the years, giving the rider more on board power to augment the rider's own muscle power in travel and commuting. However, the internal combustion engine causes both noise and air pollution and impedes the easy handling of the bicycle. Heavy batteries, with lead, to drive an electric motor, require constant recharging and can run down at inconvenient times, necessitating more effort and energy to pedal the additional weight to an energy renewal point. Moreover, there are added problems and costs of maintaining and recycling battery materials. The net result of designs using such prior art is that the vast majority of bicycles in use do not reflect a public desire to make consistent use of the presently available types of powered technology for bicycles.

It is to be understood that the foregoing general description and the following detailed description and illustrations are exemplary and explanatory of the selected embodiments and are not to be considered as restrictive of other embodiments.

DRAWINGS

FIG. 2 is an enlarged perspective view of a first embodiment, a fixed LIM secondary mount to be used in an environment that is substantially unimpeded by obstructions or debris.

FIG. 3 is a left side elevation of a second embodiment wherein the fixed LIM secondary connection has a segment of flexible cable at the lower end which gives constrained flexibility to the secondary to handle slight surface bumps while eliminating any chance of adverse force feedback to the LIM secondary on the bicycle.

FIG. 4 is an enlarged detail view from FIG. 3 showing the embodiment in greater detail.

FIG. 5 is a section taken along the view lines 5-5 of FIG. 4 showing the side movement of the flexed cable in phantom.

FIG. 8 is a left side elevation of the preferred LIM secondary embodiment on the bicycle.

FIG. 9 is a FIG. 8 enlarged view circle.

FIG. 11 is a rear perspective of the bicycle with LIM secondary and LIM primary in phantom.

FIG. 12 is a FIG. 11 view circle enlargement of lift rod attachment means.

FIG. 13 is a front elevation of the LIM secondary in the extended lower position and in the retracted position, in phantom, and also showing a cover in phantom.

FIG. 14 is a front view elevation cross-section, viewed along the arrows 14-14, showing the preferred embodiment attachment in the lowered and raised positions, with the raised position and cover in phantom.

FIG. 15 is a perspective view of a LIM primary in a pathway segment as installed in a road surface.

FIG. 17 is a perspective view of a symmetrical, surface-anchored pathway for LIM primary installation with the on-ramp displaced for clarity.

FIG. 18 is a FIG. 17 view circle, enlarged, isometric view of the entry cross-section area of the pathway.

FIG. 19 is a partially weather-covered set of surface-anchored, asymmetric pathway segments having entry and exit ramps.

FIG. 20 view circle of FIG. 19 is an enlarged detail of the entry ramp area of the pathway.

FIG. 21 view circle of FIG. 19 is an enlarged detail of the exit ramp area of the pathway.

Figure 22:
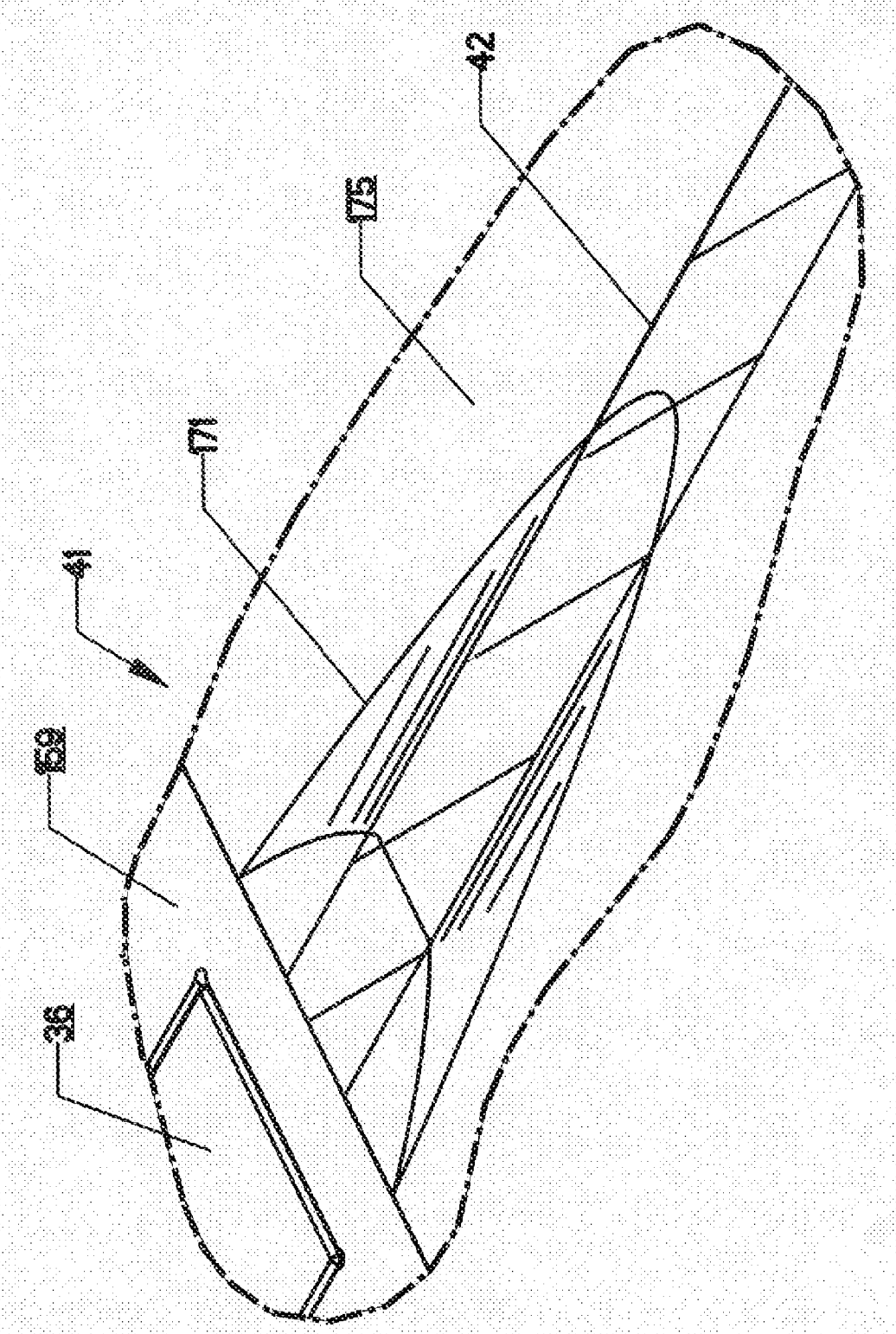

FIG. 22 is a FIG. 19 view circle enlargement, showing one of multiple, shallow, recessed surface areas on approach to the LIM primary which provides a wheel-guiding lead-in for the bicycle rider, toward the centerline of the LIM primary.

FIG. 23 is a cross-section of the asymmetric covered pathway segment and LIM primary installation.

FIG. 24 is a FIG. 23 view circle, enlarged detail.

Figure 25:
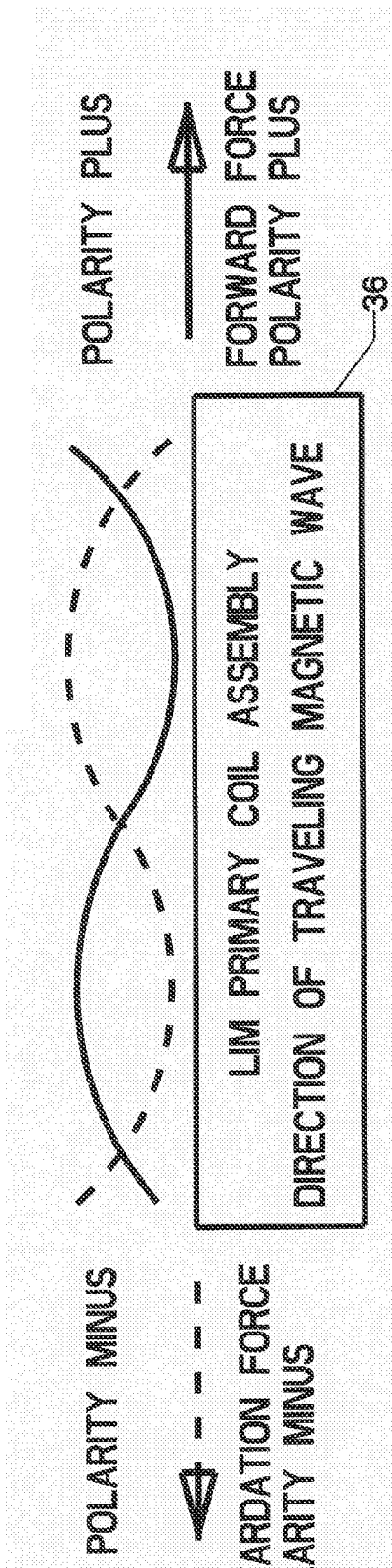

FIG. 25 is a block schematic of the LIM primary showing, the bi-directional nature of the directed magnetic traveling wave and relative polarity effects when the LIM primary is receiving power from an electric utility.

Figure 26:
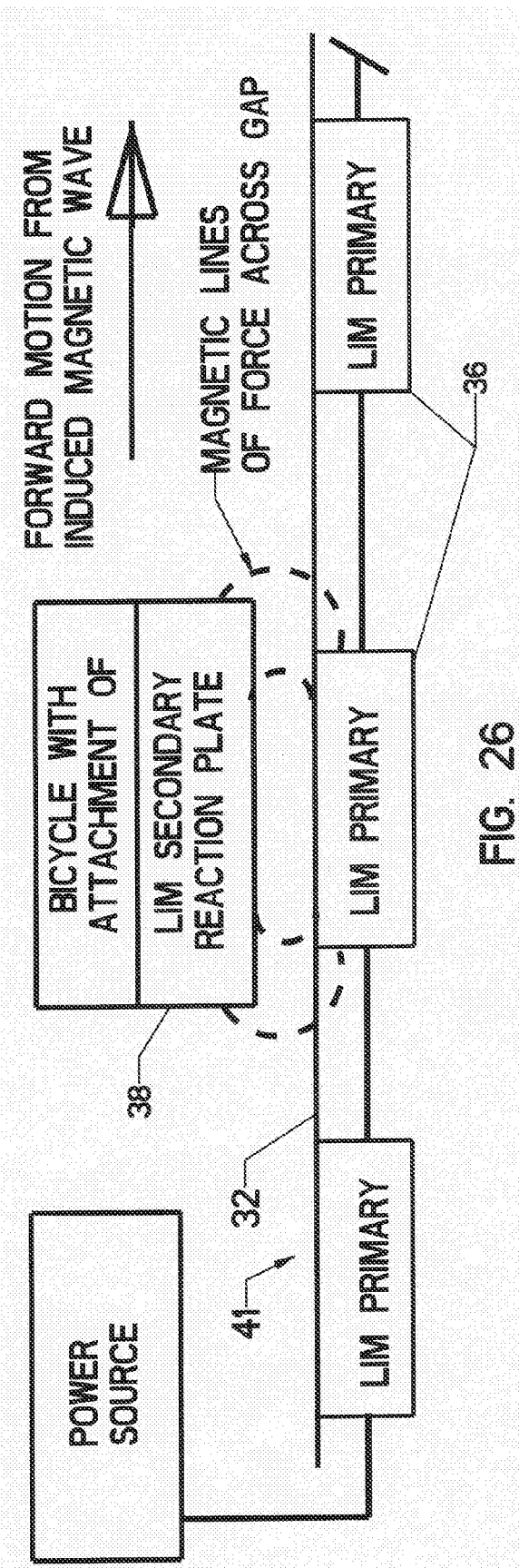

FIG. 26 is a block schematic showing the mechanical relationship of the bicycle affixed LIM secondary and the LIM primary.

Figure 27:
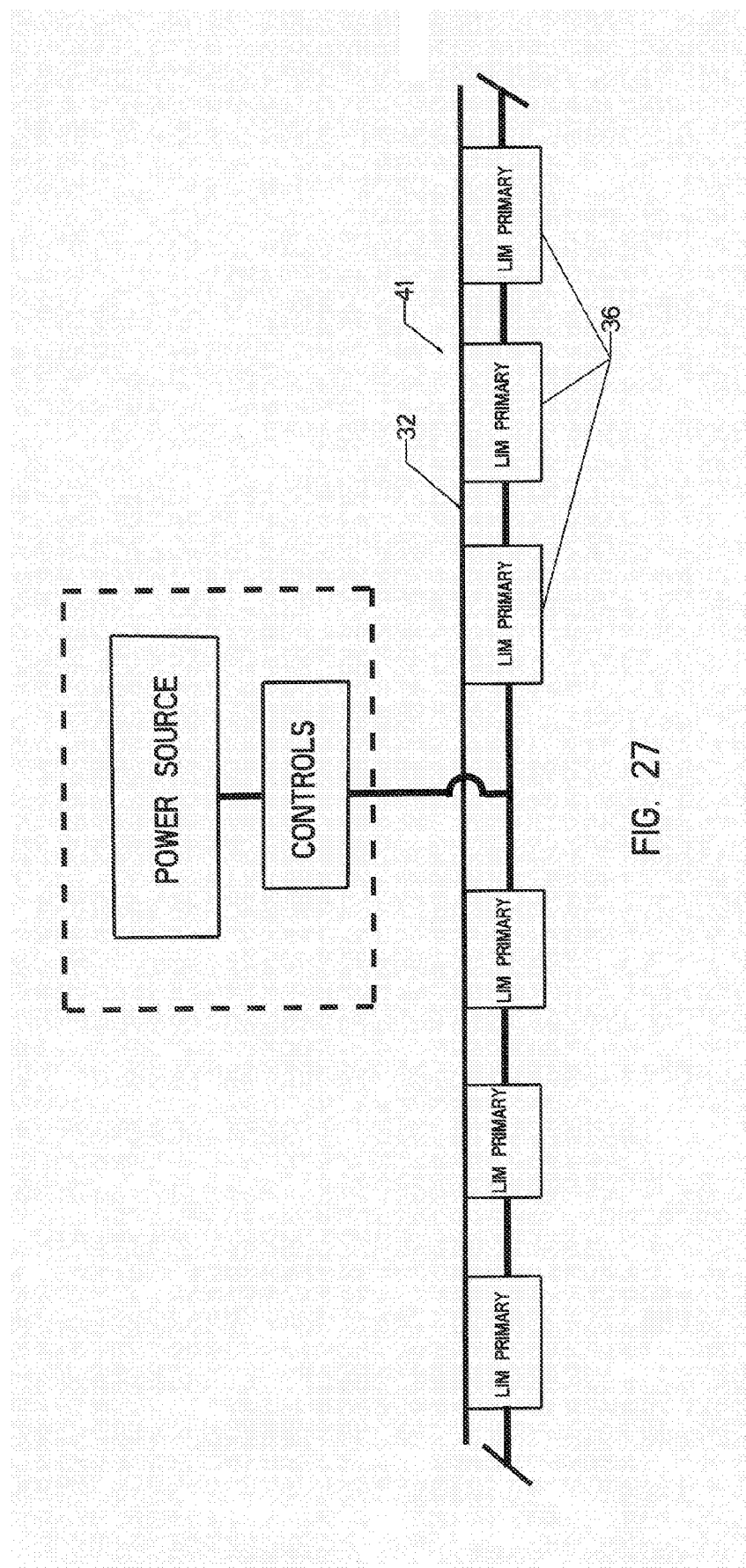

FIG. 27 is a block schematic of the LIM primary electrical system installation, showing the relationship to electrical power supplied to the LIM primaries either positioned in a roadway or within a fabricated and anchored pathway.

DESCRIPTION

How a Person, as a Rider, Using a Muscle-Powered Vehicle Such as a Bicycle, when he or she is Applying Muscle Power to the Pedals and is Directing the Bicycle Along a Designated Pathway, Realizes the Bicycle is Receiving Intermittent Thrust Created by Spaced, Temporarily Completed Linear Induction Motors, Briefly Referred to as LIMs.

Figure 1:
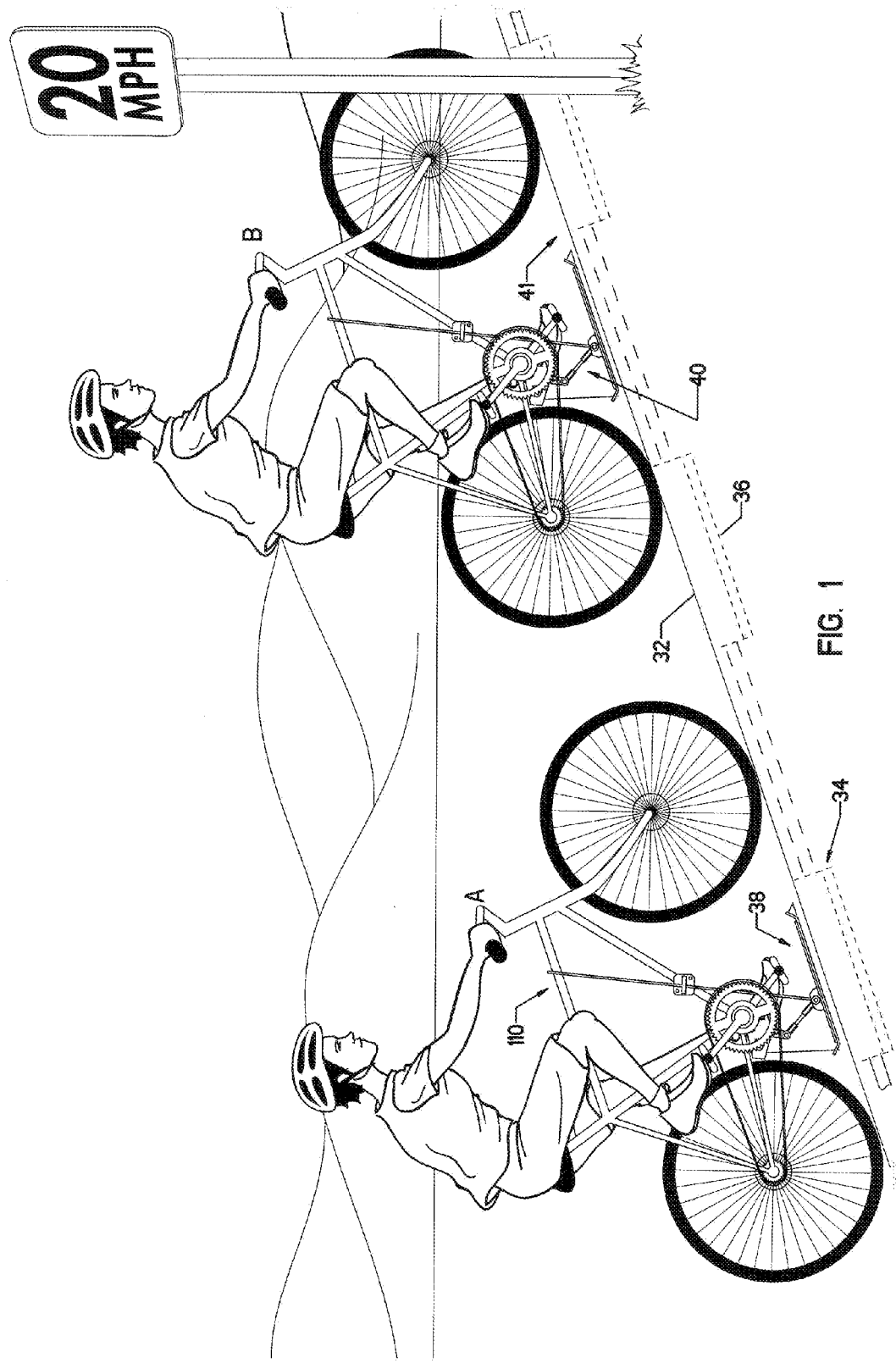
FIG. 1 is a side elevation of bicycle riders A and B pedaling on an uphill pathway and showing how only rider A is receiving a temporary thrust positioned over the LIM primary, while rider B is relying only on muscle power at the position between LIM primaries.

Riders A and B of bicycles 110, are shown in FIG. 1, riding uphill along a designated pathway 41, having a bicycle ridable surface 32. Each bicycle is equipped with a secondary of a linear induction motor 38, briefly referred to as a LIM and as an attachment 40. The pathway 41 has multiple LIM primaries 36, with each primary being selectively spaced apart from other primaries, and each primary, via circuitry, is receiving electrical energy from a utility source, not shown.

When the rider A of the bicycle 110 having the secondary 38 of a LIM reaches the location such as the primary 36, receiving the utility electrical power and the rider has the secondary 38 of the LIM selectively placed to be close to the primary 36, then the bicycle will soon be receiving a thrust created by a temporarily completed linear induction motor 34, briefly referred to as a LIM.

As the rider directs the bicycle 110 equipped with the secondary of the LIM over each active primary of a LIM, there is created a traveling wave magnetic field that induces current in the secondary which creates its own magnetic field. Then these magnetic fields of the primary and secondary interact to create a forward thrust force applied to the bicycle.

As the rider continues to direct the bicycle along the designated pathway, he or she realizes the advantages of the bicycle receiving these timely, intermittently created, forward thrust forces at the locales of the temporarily completed linear induction motors, briefly referred to as LIMs.

Rider B is shown with the LIM secondary between LIM primaries 36, and is not receiving the intermittently created thrust that causes a complete LIM motor.

Fixed Attachment Means for the LIM Secondary on the Bicycle to be Ridden on Pathways Free of Debris.

The first embodiment of LIM secondary attachment means is shown in FIG. 2, where the bicycle is to be operated over unobstructed areas which do not require the lifting of the secondary.

FIG. 2 is a top, left side perspective view of a fixed link stem assembly 69, with thumbscrew 115 secured to bicycle kickstand plate 117 on bicycle chainstay 91, and attach plate 57. The lower end of fixed link stem 68 is affixed to base 80 with fasteners 53 and base 80 is affixed to secondary 38 with fasteners 59 and washers 58, positioned above primary 38.

A Shrouded Cable Embodiment of an Attachment Means Used when a Bicycle Runs on a Pathway which is a Substantially Unencumbered Surface FIG. 3, a second embodiment, is a left side elevation of the bicycle 110, showing an attachment means 48 for the LIM secondary 38, where the bicycle is being ridden on an unencumbered surface with flexible shrouded cable 46 and brush 33 on the LIM secondary 38. In phantom is shown the completed primary LIM 34 motor and LIM primary coil 36 with electrical cables 37 and positioned in pathway 41 with the bicycle tires upon ridable surface 32.

FIG. 4 is a FIG. 3 view circle, enlarged detail side view. Shown is a cable shroud assembly 48 with flexible cable 46 contained inside the shroud tube 55. One attach plate 57 butts up against kick stand plate 117 and is affixed with thumbscrew 115 to the plate 117 with fastening means 54 and 131. The base attach 51 is at the lower end and is affixed to the cable 46 with clamp bolt 54 and to LIM secondary 38, consisting of aluminum sheet 50 and steel plate 49, with fasteners 56 and washers 58. Ridable surface 32 is shown as a part of pathway 41 and completed LIM primary 34.

FIG. 5 is a FIG. 4 partial cross-section projection along arrows 5-5 and viewed in the direction of the arrows, showing the flexible cable 46 as constrained by a low modulus material torus 47, whose outer diameter is secured within the shroud tube 55 of the shroud assembly 48. Shown also in the deflected position, in phantom, is the flexure cable 46 that constrains the LIM secondary 38 from moving sideways in to the area of pedal rotation and flexibly decouples the potential for the LIM secondary to transfer any extraneous forces back to the frame of the bicycle.

A Cable and Segmented Pulley Embodiment of an Attachment Means on the LIM Secondary Used when a Bicycle Runs on Normal Roughness Surfaces.

Figure 6:
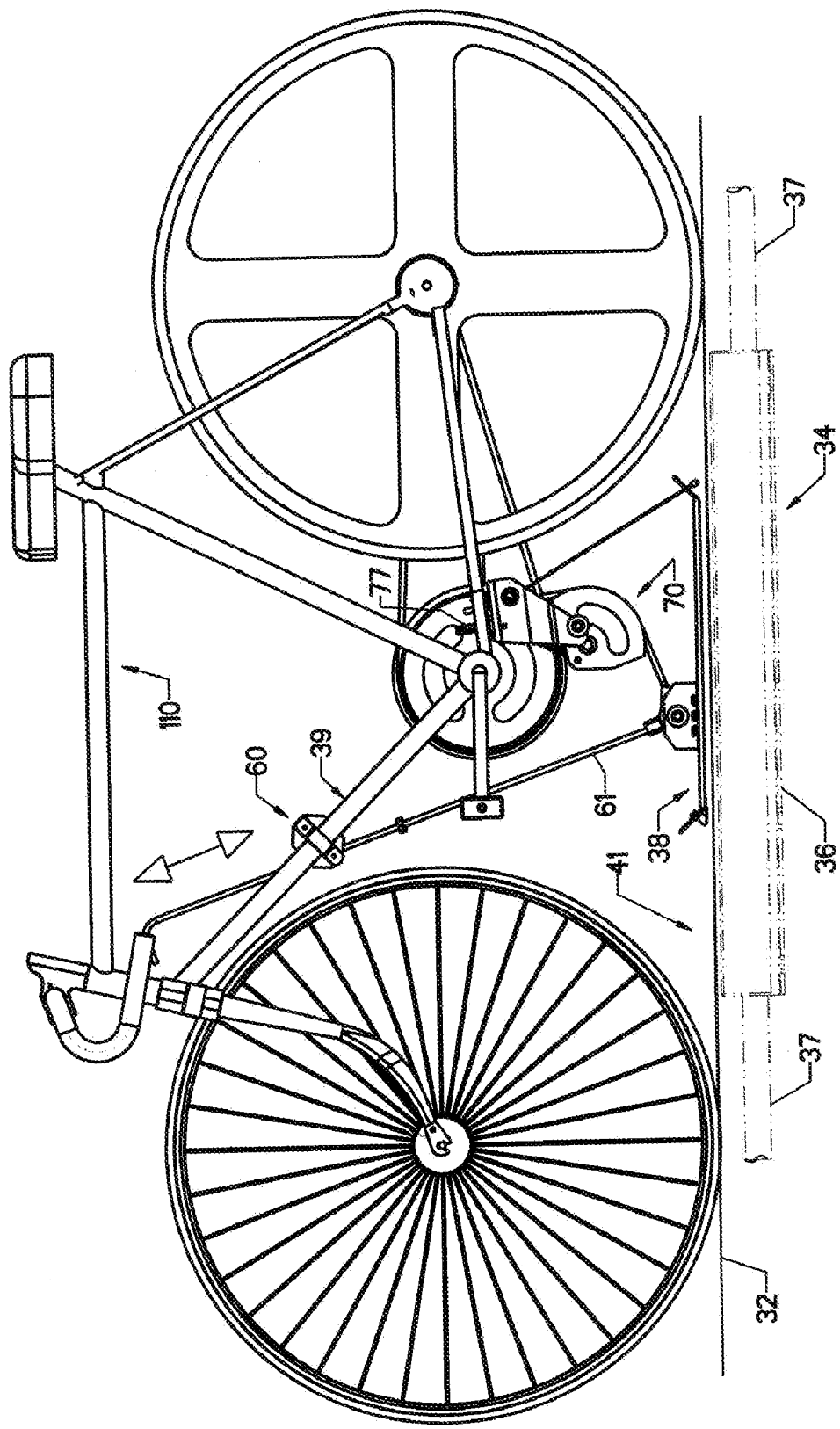
FIG. 6 is a left side elevation, of the third embodiment of a bicycle mounted LIM secondary attachment means and lift rod vertical control, utilizing a cable and a spring-assisted, rotating, partial pulley segment showing the bicycle-mounted LIM secondary attachment means which is also shown in perspective in FIG. 7.
Figure 7:
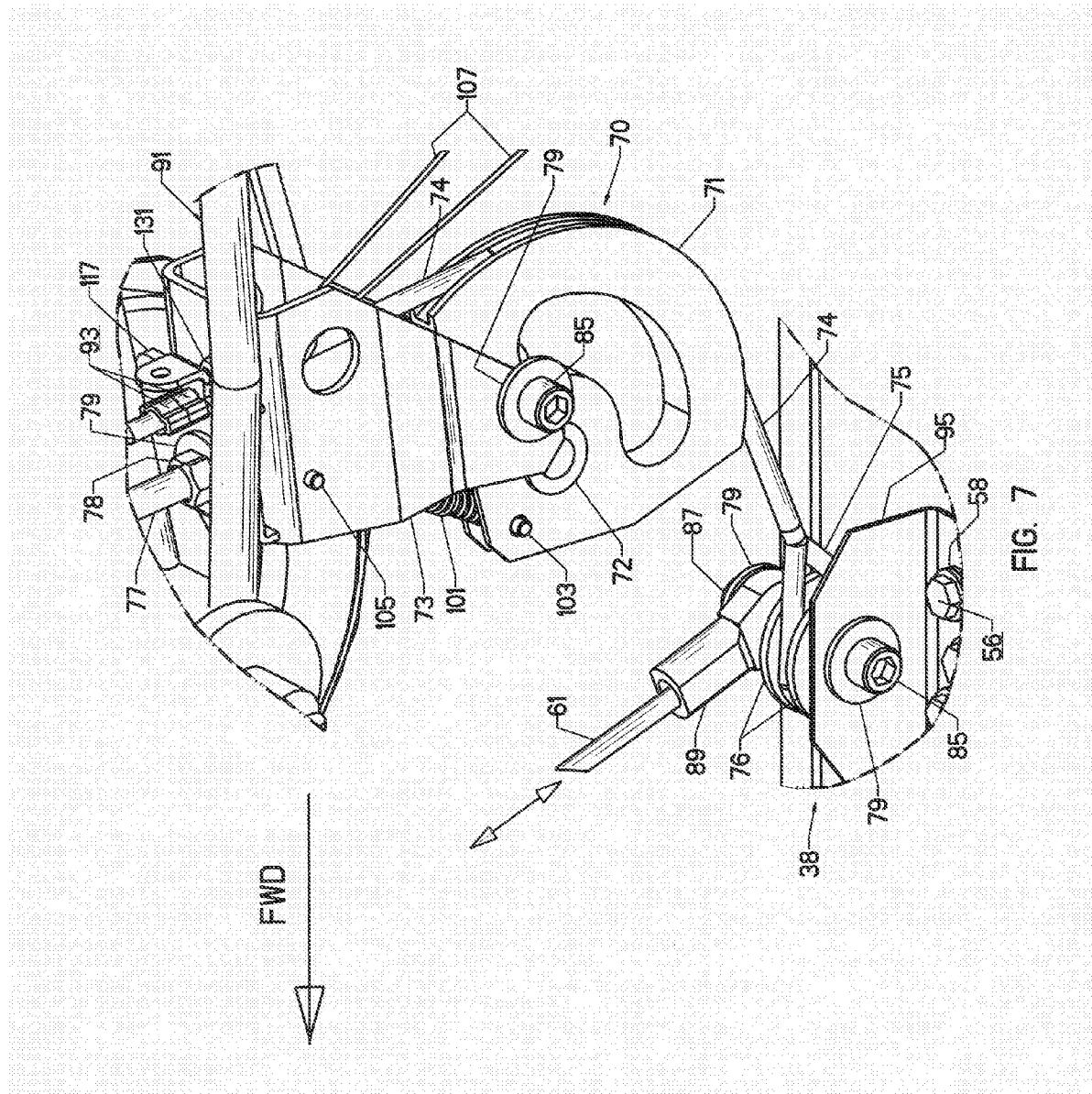
FIG. 7 is a left side perspective view of FIG. 6 embodiment.

A third embodiment permits the LIM secondary to be positioned over the LIM primary, and is shown in FIGS. 6 and 7 as a segmented pulley, cable and LIM secondary assembly.

FIG. 6 is a left side elevation of a bicycle 110 showing how the LIM secondary can be raised and lowered by the retractor means 70, affixed to the bicycle frame with fastener 77. The bicycle is on a pathway 41 and a ridable surface 32 over an electrically complete LIM motor 34. Portions of power cables 37, are shown in phantom on primary 36. Lift rod 61, which is used to lower and lift the secondary 38, is constrained to substantially linear movement by affixed lift controls, 60 attached to bicycle down tube 39.

FIG. 7 is a FIG. 6, enlarged, left side, detail perspective view of a partial pulley segment 71, of the retractor means 70, which uses a cable 74 to constrain the secondary 38 from excessive excursions to the side and into the plane of pedal rotation. The attachment means retractor 70 is secured to the dependent sides of the bracket 73 which is secured through the hole in the kick stand plate 117 with pivotable fastening means and bolt 77, nut 78, and washer 79. The pulley segment 71, with unused center flanged bearing 72, is secured to the pulley mount channel 73 with an offset pivot bolt 85 and flat washer 79, enabling the partial pulley segment to act as a fixed link, rather than a rotating pulley. Cable 74 is wrapped around the circumference of the partial pulley segment 71 and is held in place between the bicycle chain stays 91 with cable clamps 93 and thence around the partial pulley segment 71 to the cable thimble 75 between washers 76 and with pivot bolt 85 through bracket 95, washers 79 and 76 and nut 87 against washer 79 and spherical bearing end 89, from which extends partial lift rod 61. Bracket 95 is held to the secondary 38 with fastening means 56 and washers 58. The pulley segment 71 is spring-loaded in clockwise rotation, from the left hand side view, with spring 101 which is secured to pins 103 and 105 at each end of the spring to provide a lifting and rotational force when the secondary 38 is released from constraint by the lift rod 61. Partial V-tension element 107 is secured around an eyelet (not shown) with nut 131 and is shown extending from below the top surface of pulley mount channel 73 and partially down toward the rear angled surface of the LIM secondary (not shown) to act as a stabilizing constraint against excessive rearward movement during retraction.

A Retraction Mode, Articulated Link Preferred Embodiment of the Secondary Attachment Means The fourth, preferred embodiment is shown in FIGS. 8 through 14. There is a further, side-to-side rigidity of the elbow-shaped attachment with two spherical bearings which decouples any extraneous forces on the LIM secondary from feeding back to the bicycle frame.

In FIG. 8, a left side elevation of the bicycle and the LIM secondary 38 and attachment means 40 are shown as installed in the extended position over pathway 41 and ridable surface 32. Flush-mounted and completed LIM primary motor 34 and partial power cables 37 attached to LIM primary coil assembly 36, are shown in phantom. The lift rod 61 and lift rod assembly 60 are shown in relation to the bicycle frame 110 and affixed to bicycle front down tube 39.

FIG. 9 is a FIG. 8 view circle, enlarged detail of the upper attachment means. A channel mount bracket 113 having dependent sides is secured to bicycle chain stays 91 with a single thumbscrew 115 and through a hole in the bicycle frame kickstand plate 117 which is attached to bicycle chain stays 91 and permits quick removal of the channel mount bracket 113 if desired. A pivot bolt 109 passes through washer 76 and the channel mount bracket sidewalls and through coaxial holes at the top of two alike, rigid and parallel, primary attachment link arms 111, allowing them to pivot around a horizontal axis fastener normal to the dependent sides of the channel mount bracket 113. V-tension element 107 is partially shown extending below channel mount bracket 113. Nut 121 holds eyelet 119 to channel mount bracket 113, which anchors V-tension element 107. At the forward end of the channel mount 113 is a channel stop bracket 123, secured by fastening means 125 and washers 58, which hold two adjustable stop bolts 129, locked in place with nuts 131 against the channel stop bracket 123. These two bolts impinge directly upon the thickness edges of the alike, rigid and parallel, primary attachment link arms 111 and permit an adjustment to the relative height of the LIM secondary (not shown) by providing a settable stop point for the primary attachment link arms 111, which are allowed to pivot around fastener 109, connecting link rod 88 through spherical bearing 89. Induced forces on the linkage urge link arms 111 to break free of ball plunger 114, threaded in to the dependent sides of channel mount bracket 113 and affixed by lock nut 116. The transmitted force load path is then through the LIM secondary attachment means 40, the link rod 88 and the primary attachment link arms 111 to the two adjustable stop bolts 129, and thence through the channel mount 113 and to the kickstand plate 117 of the bicycle frame. Tension springs 101, attached to anchors 102, held with pins 105, provide additional lifting force to attachment means 40 during retraction of the LIM secondary. The removal of the kickstand in the pedal area of the bicycle frame itself permits the various secondary attachment methods, but commercial kickstands are also available, such as that of Wald Manufacturing Co., Inc., Assignee for patent D294014 which may attach directly to the rear wheel axle, so that the rider may still have the ability to use a kick stand for the bicycle.

Further, in FIG. 9, the ball plunger 114, retained in the dependent sides of channel mount 113 with a lock nut 116, provides a settable force against the primary attachment link arms 111, which prevents the tension spring 101 from retracting the LIM secondary attachment means 40 in its normal operational, down position. Should there be a frontal impact force upon the upward angled front of the LIM secondary 38, noted in FIG. 8, the potential impact force causes the primary attachment link arms 111 to pivot backwards and free of the ball plunger 114 normal load, thus permitting the tension spring 101 force to augment the aft moving momentum of the LIM secondary 38, not shown, and bring the assembly to an immediate upward and stowed position.

Figure 10:
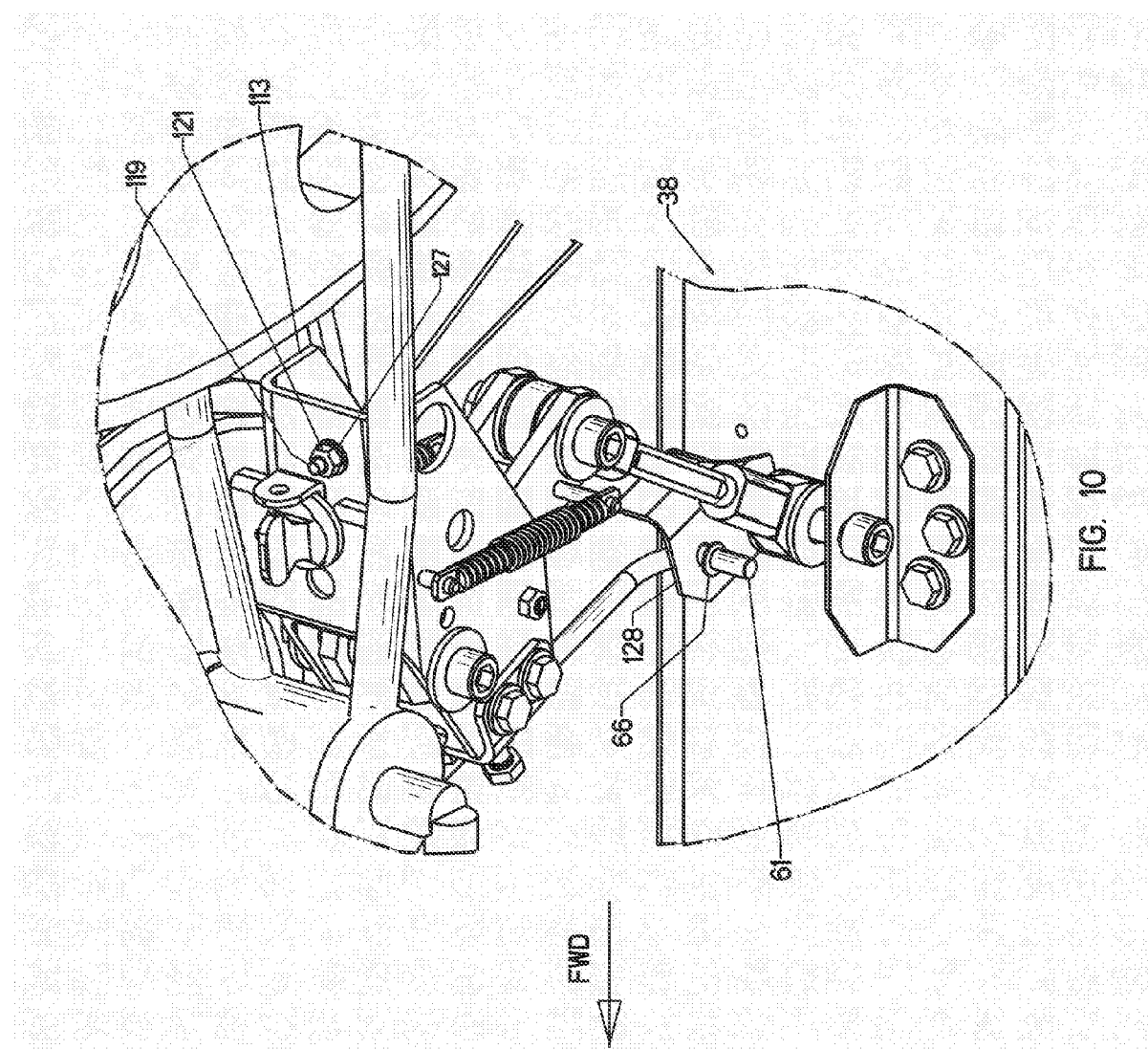
FIG. 10 is an enlarged perspective view circle of FIG. 9 attachment means and upper linkage with retraction springs.

FIG. 10 is a rear perspective of FIGS. 8 and 9 detail, showing the attachment means for all parts of the LIM secondary and its extension mechanism as detailed in FIG. 9. Eyelet 119 is affixed to channel mount bracket 113 with nut 121 and flat washer 127. E-ring 66 constrains lift rod 61 against lift rod angle bracket 128.

FIG. 11 is a rear perspective of the complete bicycle 110 with LIM secondary 38 over the completed LIM primary motor 34, lift rod 61 and lift rod assembly 60, affixed to down tube 39 behind wheel 190.

FIG. 12 is an enlarged detail of the FIG. 11 view circle, showing the details of the lift rod assembly 60, lift rod 61 and lift rod collars 64, set on lift rod angle guide 63 and all attached to the bearing plate 67 with screws 65, which is held against the bicycle down tube 39 with tube clamp 62, just aft of wheel 190.

Cover Assembly to Protect the Attachment Means of the LIM Secondary

FIGS. 13 and 14 depict a two part cover which protects against foot strike or road debris affecting movable parts of the LIM secondary attachment.

FIG. 13 is a detail front elevation of the secondary 38 with brush 33, in the lowered, and raised position, in phantom, as is cover 130. Partial LIM primary 36 and power cable 37 are shown in phantom below ridable surface 32. Rear wheel 191 is tangent to the ridable surface 32. Cross-section arrows 14-14 cut the view.

FIG. 14 is a left side elevation of the cover 130 cross-section, in phantom, looking along arrows 14-14 and viewed in the direction of the arrows in FIG. 13 and showing the lowered and raised, in phantom, secondary 38 and brush 33 with brush 33 over pathway 41 and ridable surface 32. Brackets 95 and 128 affix to secondary attachment 40 over LIM primary 36. V-tension rod 107 is retained with collars 108. Lift rod assembly 60 is affixed to front down tube 39.

Selected Pathways Having a Ridable Surface Over Positioned LIM Primaries

FIGS. 15 through 24 show pathway embodiments.

There are two major embodiments for a type of pathway 41, which have a ridable surface 32, with LIM primaries positioned with selective spacing. In the first embodiment, the LIM primaries are set in to a support block 98 which, in turn, is set in to a channel cut in to the road and the top surfaces of the LIM primaries are set flush with the road surface. In the second embodiment of pathway 41, the ridable surface pathway itself is a module that is anchored to a ground surface right of way and is also connected to a utility, not shown, supplying electrical energy to the primaries.

A Pathway Having LIM Primaries Positioned in a Channel Cut in a Roadway Surface

FIG. 15 is a perspective view of a pathway 41 and LIM primaries 36 positioned in a street support block 98; E-channel 174 is positioned in the channel cut between top channel assemblies 159, acting as bezels for primaries 36. A centerline 42 allows the rider to guide proximate the center line of the active powered area of the primaries 36.

Figure 16:
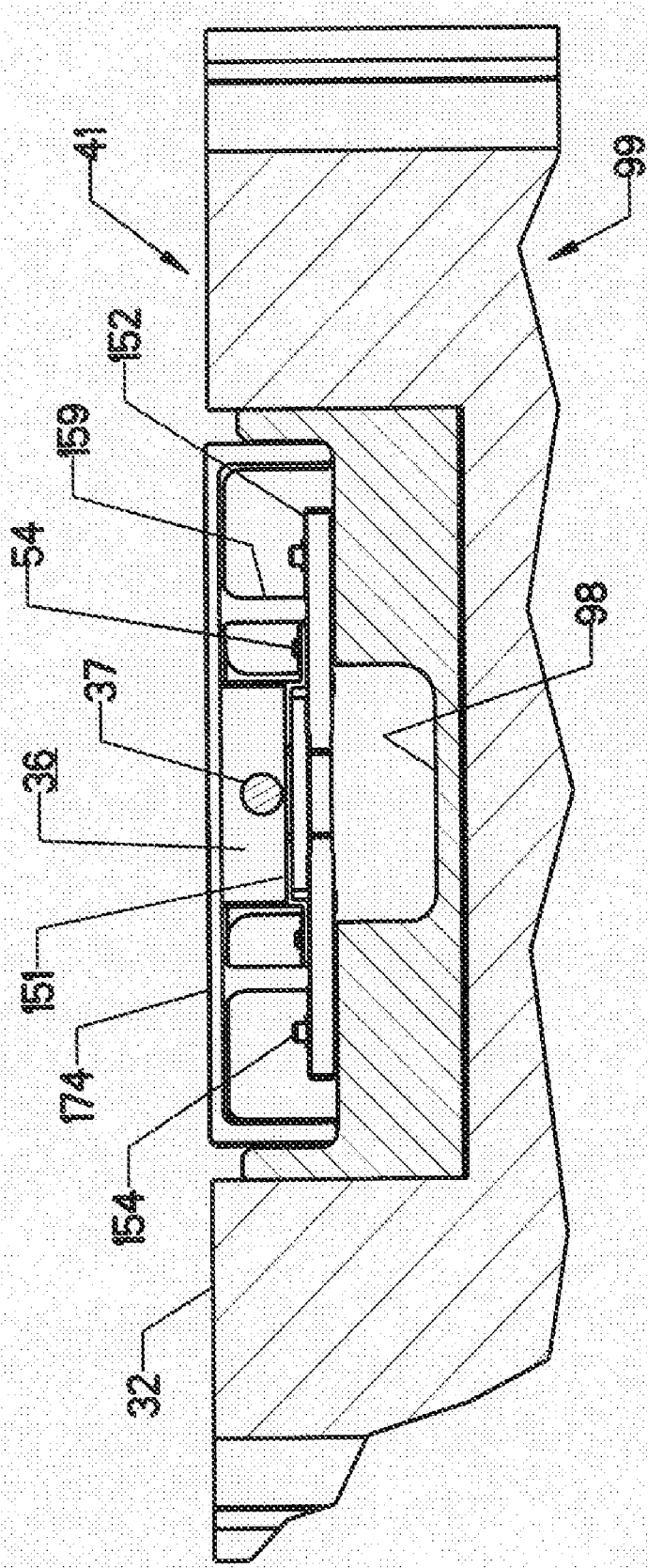
FIG. 16 is a cross-section of road surface, showing a LIM primary installation.

FIG. 16 module is an enlarged cross-section of FIG. 15 street support segment 99 with LIM primaries 36 and power cables 37 in pathway 41 with ridable surface 32 on a partial cross-section of street support block 98. LIM support plate 152 is positioned on support block 98 and attached with fasteners 154. LIM base 151 is secured to support plate 152 with fasteners 54. Bezel 159 legs are shown with long E-channel 174.

Modular Pathway with LIM Primaries is Anchored to a Ground Surface Right-of-Way

FIGS. 17 through 24 show LIM primaries positioned in anchored, modular pathway embodiments.

The symmetrical FIG. 17 modular pathway 41, allows riders to get on and off at almost any location along the length of the system, owing to gently sloping sides.

FIG. 17 is a full perspective view of a LIM primary installation in a fabricated symmetrical base pathway 150 and pathway entry ramp 153, shown displaced, for clarity, from its normal connection to the pathway segment. Guide pins 155 connect with the base 150. Top channel bezel 159 is disposed around LIM primary 36. E-channel 157 extends the top surface of pathway 41 and is shown with centerline 42 and anchoring holes 156.

FIG. 18 is an enlarged, partial detail of FIG. 17 view circle showing top channel bezel 159 with LIM primary 36 and power cable 37 set on LIM base 151 and LIM primary support plate 152. Bolts 154 retain both parts to base 150.

Modular Pathway with LIM Primaries for Riding and with Weather Protection

Where it is desirable to have the commuter protected against nominally adverse weather conditions, a covered pathway 41, with centerline 42, allows usage over a wider range of weather conditions.

FIG. 19 is a perspective view of asymmetrical pathway 160 with details, track projection light 170, window wall 162, roof 164, roof edge 166, and support frame 168 for several, weather protection segments, one of which is in partial presentation. Primaries 36 are mounted within E-channel assemblies 169 and center channels 175. Short entry channel 176 is located at ramp entry 177. Exit ramp 179 is shown at the opposite end of pathway 41 with centerline 42.

FIG. 20 is a FIG. 19 view circle enlarged detail showing the entry ramp 177 and short entry channel 176. Top channel bezel is 159 is surrounding first primary LIM 36 in the asymmetrical pathway 160 holding E-channel 169 with anchor holes 156. E-channel 169, pathway 41 and ridable surface 32, continues. Centerline 42 is shown on pathway 41 and ridable surface 32. Window wall 162, frame 168 and projection light 170 are shown.

FIG. 21 is a FIG. 19 view circle enlarged detail showing the exit ramp 179, centerline 42 and pathway anchoring holes 156 within asymmetrical pathway 160. Shown is E-channel 169, E-channel 175, pathway 41 and ridable surface 32, transitions to exit ramp 179.

FIG. 22 is a FIG. 19 view circle showing one of multiple shallow recess geometries 171, in the pathway 41 to guide wheels in to the center channel 175 as it approaches the location of the pathway centerline 42 located LIM primary 36 in surrounding top channel bezel 159, making it easier for the rider to center the bicycle's position and thus obtain the maximum thrust available from the completed LIM motor.

FIG. 23 is a cross-section of the asymmetrical pathway 160 with top channel bezel 159, ridable surface 32 of pathway 41, LIM primary 36, power cable 37 and showing partial structural details 162 and 168, with attached projection light 170.

FIG. 24 is a FIG. 23, view circle detail, of asymmetrical pathway details, LIM primary 36 and power cable 37. Bolts 154 fasten LIM support plate 151 and LIM primary base 152. Top channel bezel 159 provides pathway 41 and ridable surface 32 continuity. E-channel assembly 175 is a long channel pathway support and 176 is a short channel pathway support.

Schematic Block Diagrams for Understanding Systems

The block schematics of FIGS. 25 through 27, relate functional elements of the system.

FIG. 25 is a schematic representation of a LIM primary 36 with electrically switchable polarity control of the magnetic traveling wave direction which induces current and a subsequent, interacting magnetic field force in a LIM secondary.

FIG. 26 is a block schematic of the mechanical relationships between LIM secondary 38, LIM primary 36, and pathway 41 with ridable surface 32.

FIG. 27 is a block schematic of the power and control components for a LIM electrical system with pathway 41 and ridable surface 32 noted in relative position to LIM primaries 36.

Operation of the LIM System and Method

The LIM design thrust, established between the interaction of LIM primary and LIM secondary, and dependent upon the slope of the pathway and the mass of the vehicle, is taken at a value that is gentle enough in acceleration so as to minimize any rearward body pitch tendency by the rider. The rider feels a thrust force at short time intervals in the forward travel mode at a chosen LIM primary spacing and design velocity, which is a function of LIM voltage and electrical current. The LIM secondary magnetic thrust, as developed, is applied at an extremely low geometric position, relative to the vehicle and rider center-of-gravity. In this manner, the transient thrust load is applied to the vehicle frame only in a forward horizontal direction, there being no other significant directional or out-of-plane forces imposed upon the bicycle. Forces that may occur, other than those propelling the bicycle forward, are uncoupled from the bicycle frame by the various attachment means whereby couplings are designed only to support those forward thrust forces.

Retardation Forces

LIM-controlled, polarity reversal at the primary coil assembly provides an additional, slowing process, as shown in FIG. 25 if applied in downhill braking. The LIM secondary, rather than inducing a forward thrust force, as it traverses the LIM primary, may induce a controlled and softer, reversed, to the direction-of-travel, force which supplements the rider's hand brake, wheel rim braking action.

Conventional bicycle, wheel rim, braking systems are a rotating and translating mass that present a significant reduction in braking ability under wet road conditions with the manually controlled, wheel rim-friction braking devices attached to the bicycle frame. There is, therefore, the inherent, LIM-controlled capability to provide additional braking with a "soft" electro-magnetic force reversal, which may then provide a significant and increased additional element of safety in slowing or stopping the bicycle under wet weather and road conditions.

Other LIM Controls

Provision may be made for methods of switching the primary LIMs OFF and ON through the application of a software-driven logic network and sensor conditioning packages that maximize the throughput efficiency for multiple users of the system and also provide for the prevention of a condition that allows approaching the LIM primary from any but the correct direction, thus preventing an undesired, reversed magnetic thrust vector from occurring with an inadvertent wrong direction approach to the system by a rider.

Sudden Impact Load Handling

All LIM secondary embodiments, except those that are fixed, are retracted automatically with a sudden frontal impact load that releases the raising mechanism for the specified embodiment.

For example, this condition occurs upon accidental contact with road markers or other small obstructions. The attachment means, upon sudden aft loading of the LIM secondary, will retract the LIM secondary, upward, in the plane of the vehicle frame, to its stowed position, parallel to the ridable surface. This action does not result in any significant impulse loads being transferred to the rider-vehicle combination because of attachment design embodiments which minimize any tendency to destabilize the regular, dynamic forces on the bicycle.

Quick Attach and Detach Mode for the Secondary on the Bicycle

A quick release fastener 115 at the point of attachment to the frame of the bicycle, as shown in FIG. 10, permits quick detachment of the whole secondary assembly 38 should the user desire. A locking means, not shown, may be attached to the fastener and frame to minimize the potential for theft of the LIM secondary from the bicycle frame.

Other Possible Embodiments

While embodiments of the present invention have been illustrated and described, it will be apparent that other embodiments may be made without departing from the invention.

I claim:

1. A manually-powered vehicle, generally a bicycle, equipped with a secondary of a linear induction motor, referred to as a LIM, with an attachment means, so that when a rider guides a bicycle over a pathway equipped with spaced primaries of LIMs, when primaries are receiving power from an electric utility through circuitry in a pathway, then, as the bicycle is ridden over each LIM primary, causing a completed LIM motor, a transient magnetic thrust force is created whereby the combining of the rider's muscle power with the LIM power is obtained by using the following apparatus which comprises:
   a) a manually-powered vehicle, generally a bicycle;
   b) a secondary of a LIM, referred to as a LIM secondary;
   c) attachment means to secure the secondary of a LIM to a bicycle;
   d) a pathway having a ridable surface for bicycles;
   e) primaries of LIMs, referred to as LIM primaries, spaced along a pathway; and
   f) an electrical power source and circuitry for transmitting electrical energy to the LIM primaries.

2. The apparatus of claim 1, wherein a LIM secondary comprises:
   a) a steel plate attached to an aluminum sheet;
   b) an aluminum sheet, having a back end segment angled upwards to make provision for attachment of a stabilizing tension means and a front end angled upwards to receive a brush attachment means;
   c) a stabilizing tension means affixed between a bicycle frame and the back end segment, angled upwards on the aluminum sheet to prevent excessive movement of the LIM secondary, down and to the rear during secondary retraction; and
   d) brush means extending below the aluminum sheet bottom surface to clear minor debris from entering a gap space.

3. The apparatus of claim 1, wherein a LIM secondary comprises:
   a) a steel plate attached to a copper sheet;
   b) a copper sheet having a back end segment angled upwards to make provision for attachment of a stabilizing tension means and a front end segment angled upwards to make provision for a brush attachment means;
   c) a stabilizing tension means affixed between a bicycle frame and the back end segment, angled upwards on the copper sheet to prevent excessive movement of a LIM secondary, down and to the rear during secondary retraction; and
   d) brush means extending below the aluminum sheet bottom surface to clear minor debris from entering a gap space.

4. The apparatus of claim 1, wherein an attachment means to secure the secondary of a LIM to a bicycle is fixed between a bicycle frame and a LIM secondary and comprises:
   a) a fixed link stem affixed to a bicycle frame and projecting downward in the cantilever mode; and
   b) a clamping means joining a LIM secondary to the cantilevered end of the connecting element.

5. The apparatus of claim 1, wherein there is a shrouded cable embodiment of an attachment means to secure the secondary of a LIM to a bicycle used when a bicycle runs on a pathway which is a substantially unencumbered surface and comprises:
   a) a shroud of hollow cross-section affixed to a bicycle frame and projecting downward in the cantilever mode;
   b) a length of cable, extending through and below the hollow cross-section shroud and affixed to the bicycle frame at its top and to a LIM secondary at its bottom;
   c) a torus of low modulus material affixed near the exit of the inside of the shroud and surrounding the emerging cable; and
   d) a clamp affixed to the top surface of the LIM secondary with fastening means also grips the lower portion of the cable extended below the shroud.

6. The apparatus of claim 1, wherein an attachment means to secure the secondary of a LIM to a bicycle includes means to raise and lower a LIM secondary, utilizing a cable, a segment of a pulley and a bracket subassembly, and a lift rod subassembly attached to a LIM secondary and constrained in a bearing support against a bicycle frame, comprising the arrangement of:

a) a bracket secured to the bicycle frame at a location below and behind a pedal axis, using a fastening means passing through a hole in a kick stand plate on the bicycle frame, and through a hole in a mounting base of the bracket which has parallel dependent sides extending downward and having two, coaxial holes normal to the parallel dependent sides near the lower periphery of a bracket which is adapted to receive a segment of a round pulley;

b) a segment of a round pulley, designed as a pivoting link, rather than a rotary link, having a pivot axis eccentrically offset from the center pivot axis and positioned between bracket dependent sides by using a pivotal fastening means adapted to receive a partial segment of a tension cable which permits a completed LIM primary force to be developed by the LIM secondary and thence to the bicycle frame;

c) a tension cable attached to the bicycle frame and extending downward and around the groove of the segment of the round pulley and then secured to the LIM secondary; and d) lift controls to permit movement of the LIM secondary up and down over a finite vertical range and constrain the LIM secondary in the position chosen.

7. The apparatus of claim 1, wherein an attachment means to secure the secondary of a LIM to a bicycle includes means to raise and lower a LIM secondary, utilizing a rigid set of links connected by rotating and spherical bearings and comprises:

a) a bracket secured to a bicycle frame at a location below and behind a pedal axis, through a hole in a kick stand plate on a bicycle frame with a fastening means and through a hole in a base of a bracket having dependent sides extending downward and having two, coaxial holes normal to parallel sides at a point near a lower periphery of a bracket where there can be secured a segment of a round pulley between the bracket sides with an axial fastening means;

b) a pair of alike, spaced parallel rigid links having coaxial holes at each end and secured through a top set of coaxial holes to a bracket with dependent sides to receive holes for a pivot axis and the bracket adapted to be fastened to the bicycle frame with selected fastening means through a hole in the kick stand plate of the bicycle frame and the alike, spaced parallel rigid links are supported on the dependent sides of the bracket with an axial fastening means through the dependent sides of the bracket;

c) a spherical bearing which is secured through an axial hole in a spherical portion of the bearing and is positioned between lower coaxial holes of the alike, spaced parallel rigid links then secured with an axial fastening means and being further selectively fastened to a single, rigid link which extends to a second spherical bearing at an opposite end;

d) a pair of spherical bearings which are selectively fastened at the opposite end of the extended rigid link and secured to an attachment means on a LIM secondary fitting with axial fastening means;

e) tension springs located outboard of dependent sides of the bracket and to a set of pins, one affixed through the top of the bracket, and through coaxial holes in the bottom pair of alike, spaced parallel rigid links;

f) a pair of threaded and lock nut-secured, adjustable, compression, spring-loaded pins which are secured through the outboard, dependent sides of the bracket and impinge upon the outer sides of the pair of alike, spaced parallel rigid links to constrain lifting of a LIM secondary until required by usage conditions, such as sudden impact on the front of the moving secondary.

8. The apparatus of claim 6 further comprising:

a protective cover affixed to a bicycle frame near a pedal axis and substantially covering moving parts that attach, lift and lower a LIM secondary so that protection is afforded against accidental foot strike, rocks and road debris, the LIM secondary forming a base part of the cover to effect a full closure protection of attachment means moving parts when retracted.

9. The apparatus of claim 7 further comprising:

a protective cover affixed to a bicycle frame near a pedal axis and substantially covering moving parts that attach, lift and lower a LIM secondary so that protection is afforded against accidental foot strike, rocks and road debris, the LIM secondary forming a base part of the cover to effect a full closure protection of an attachment means moving parts when retracted.

10. A pathway having a fabricated, continuous channel of chosen length to receive spaced LIM primaries which are embedded in the pathway and retained with top surface flush with a pathway surface wherein electrically connected LIM primaries are spaced in contiguous fashion according to degree of surface incline and predetermined range of vehicle mass to be given an augmented thrust when a secondary of the LIM is positioned substantially over a LIM primary to cause a condition for a completed LIM, thus permitting a bicycle or other manually powered vehicle with attached secondary to receive the augmenting thrust, comprising:

a) LIM primaries embedded within a stiffened, flat ridable surface and a bezel having a rectangular surface opening of predetermined configuration to allow flush, surface positioning of the LIM primary within a ducted structure environment and retaining ridable continuity and fabricated so that there is excess structural integrity of the ridable surface in order to preclude potential damage by forces from heavier vehicles on conventional streets;

b) LIM primaries spaced between pathway extensions of a structurally stiffened, ridable surface; and c) circuitry to carry electrical power along the full length of the pathway and means to provide electrical power and control to the LIM primaries.

11. The pathway of claim 10, further comprising:

a) a prefabricated ridable surface of contiguous segments of predetermined design set on and anchored to a ground surface;

b) LIM primaries embedded within the prefabricated ridable surface and fixed, top flush, within ridable segments and connected electrically to accept power from a power source and adapted to transfer magnetic propulsion power forces to a secondary mounted on a bicycle or other manually-powered vehicle; and c) electrical circuitry, hardware and controls adapted to be connected to and between primaries of the LIMs at the selected locations along the prefabricated ridable surface of contiguous segments, and to an electrical energy power source wherein the power source is adapted to be controlled with appropriate commercialized apparatus.

12. The pathway of claim 10, further comprising:
a covered and protected pathway surface to receive a bicycle or other manually powered vehicle.

13. The pathway of claim 10, further comprising:
a) a method of achieving augmented manual propulsion effort by a rider of a vehicle in uphill and long distance travel;
b) attaching a LIM secondary to a manually-powered vehicle;
c) providing a pathway and installing LIM primaries along the pathway at predetermined, spaced locations;
d) providing electrical wiring between LIM primaries and connecting the circuitry to an electric power source;
e) providing a condition where, when the electric power is on, and a rider propels the manually-powered vehicle along the pathway and over a LIM centerline to receive propulsion energy up to some predetermined, maximum velocity, as designed in to the LIM primary, it permits the rider to exceed the augmented design velocity if physical ability allows it, over longer distances than might be obtained under a normal, non-augmented condition; and
f) pre-calculating the required spacing of LIM primaries to supply sufficient augmenting power for a range of ridable surface slopes and a weight range of vehicle sizes.

14. A manually-powered vehicle, generally a bicycle, and equipped with a secondary of a linear induction motor, referred to as a LIM, with an attachment means, so that when a rider guides a bicycle over a pathway equipped with spaced primaries of LIMs, when primaries are receiving power from an electric utility, through circuitry in a pathway, then, as the bicycle is ridden over each LIM primary, causing a completed LIM motor, a transient magnetic thrust force is created whereby the combining of the rider's muscle power with the LIM power is obtained by using the following apparatus which comprises:
a) a manually-powered vehicle, generally a bicycle;
b) a secondary of a LIM, referred to as a LIM secondary;
c) attachment means to secure the secondary of a LIM to a bicycle;
d) a pathway having a ridable surface for bicycles;
e) primaries of LIMs, referred to as LIM primaries, spaced along a pathway;
f) an electrical power source and circuitry for transmitting the electrical energy to the LIM primaries; and
g) wherein the attachment means includes means to raise and lower a LIM secondary, utilizing a rigid set of links connected by rotating and spherical bearings and comprises:
  i) a bracket secured to a bicycle frame at a location below and behind a pedal axis, through a hole in a kick stand plate on the bicycle frame with a fastening means and through a hole in a base of a bracket having dependent sides extending downward and having two, coaxial holes normal to parallel sides at a point near a lower periphery of the bracket where there can be secured a segment of a round pulley between the bracket sides with an axial fastening means;
  ii) a pair of alike, spaced parallel rigid links having coaxial holes at each end and secured through a top set of coaxial holes to a bracket with dependent sides to receive holes for a pivot axis and the bracket adapted to be fastened to the bicycle frame with selected fastening means through a hole in the kick stand plate of the bicycle frame and the alike, spaced parallel rigid links are supported on the dependent sides of the bracket with an axial fastening means through the dependent sides of the bracket;
  iii) a spherical bearing which is secured through an axial hole in a spherical portion of the bearing and is positioned between lower coaxial holes of the alike, spaced parallel rigid links then secured with an axial fastening means and being further selectively fastened to a single, rigid link which extends to a second spherical bearing at an opposite end;
  iv) a pair of spherical bearings which are selectively fastened at the opposite end of the extended rigid link and secured to an attachment means on a LIM secondary fitting with axial fastening means;
  v) tension springs located outboard of dependent sides of the bracket and to a set of pins, one affixed through the top of the bracket, and through coaxial holes in the bottom pair of alike, spaced parallel rigid links;
  vi) a pair of threaded and lock nut-secured, adjustable, compression, spring-loaded pins which are secured through the outboard, dependent sides of the bracket and impinge upon the outer sides of the pair of alike, spaced parallel rigid links to constrain lifting of a LIM secondary until required by usage conditions, such as sudden impact on the front of the moving secondary.

15. A manually-powered vehicle, generally a bicycle, and equipped with a secondary of a linear induction motor, referred to as a LIM, with an attachment means, so that when a rider guides a bicycle over a pathway equipped with spaced primaries of LIMs, when primaries are receiving power from an electric utility, through circuitry in a pathway, then, as the bicycle is ridden over each LIM primary, causing a completed LIM motor, a transient magnetic thrust force is created whereby the combining of the rider's muscle power with the LIM power is obtained by using the following apparatus which comprises:
a) a manually-powered vehicle, generally a bicycle;
b) a secondary of a LIM, referred to as a LIM secondary;
c) attachment means to secure the secondary of a LIM to a bicycle;
d) a pathway having a ridable surface for bicycles;
e) primaries of LIMs, referred to as LIM primaries, spaced along a pathway;
f) an electrical power source and circuitry for transmitting the electrical energy to the LIM primaries; and
g) wherein the attachment means includes means to raise and lower a LIM secondary, utilizing a rigid set of links connected by rotating and spherical bearings and comprises:
  i) a bracket secured to a bicycle frame at a location below and behind a pedal axis, through a hole in a kick stand plate on the bicycle frame with a fastening means and through a hole in a base of a bracket having dependent sides extending downward and having two, coaxial holes normal to parallel sides at a point near a lower periphery of the bracket where there can be secured a segment of a round pulley between the bracket sides with an axial fastening means;
  ii) a pair of alike, spaced parallel rigid links having coaxial holes at each end and secured through a top set of coaxial holes to a bracket with dependent sides to receive holes for a pivot axis and the bracket adapted to be fastened to the bicycle frame with selected fastening means through a hole in the kick stand plate of the bicycle frame and the alike, spaced parallel rigid links are supported on the dependent sides of the bracket with an axial fastening means through the dependent sides of the bracket;

iii) a spherical bearing which is secured through an axial hole in a spherical portion of the bearing and is positioned between lower coaxial holes of the alike, spaced parallel rigid links then secured with an axial fastening means and being further selectively fastened to a single, rigid link which extends to a second spherical bearing at an opposite end;

iv) a pair of spherical bearings which are selectively fastened at the opposite end of the extended rigid link and secured to an attachment means on a LIM secondary fitting with axial fastening means;

v) tension springs located outboard of dependent sides of the bracket and to a set of pins, one affixed through the top of the bracket, and through coaxial holes in the bottom pair of alike, spaced parallel rigid links;

vi) a pair of threaded and lock nut-secured, adjustable, compression, spring-loaded pins which are secured through the outboard, dependent sides of the bracket and impinge upon the outer sides of the pair of alike, spaced parallel rigid links to constrain lifting of a LIM secondary until required by usage conditions, such as sudden impact on the front of the moving secondary; and vii) a protective cover affixed to the bicycle frame near a pedal axis and substantially covering moving parts that attach, lift and lower a LIM secondary so that protection is afforded against accidental foot strike, rocks and road debris, the LIM secondary forming a base part of the cover to effect a full closure protection of attachment means moving parts when retracted.

* * * * *